(12) United States Patent
Hirayama

(10) Patent No.: US 7,984,167 B2
(45) Date of Patent: Jul. 19, 2011

(54) APPARATUS, SYSTEM AND METHOD FOR SECURE INFORMATION DISSEMINATION

(75) Inventor: Tomoshi Hirayama, Tokyo (JP)

(73) Assignee: Sony Corporation, Tokyo (JP)

( * ) Notice: Subject to any disclaimer, the term of this patent is extended or adjusted under 35 U.S.C. 154(b) by 127 days.

(21) Appl. No.: 11/175,192

(22) Filed: Jul. 7, 2005

(65) Prior Publication Data

US 2006/0069718 A1    Mar. 30, 2006

Related U.S. Application Data

(62) Division of application No. 09/810,188, filed on Mar. 19, 2001.

(30) Foreign Application Priority Data

Mar. 21, 2000    (JP) ................................. 2000-077627

(51) Int. Cl.
  *G06F 15/16* (2006.01)
(52) U.S. Cl. ...................................... 709/229
(58) Field of Classification Search .................. 709/224, 709/229, 223, 228, 217; 705/10, 74
See application file for complete search history.

(56) References Cited

U.S. PATENT DOCUMENTS

| | | | | |
|---|---|---|---|---|
| 3,852,571 A | * | 12/1974 | Hall et al. ........................ | 340/5.4 |
| 6,032,177 A | * | 2/2000 | O'Donnell ...................... | 709/204 |
| 6,292,833 B1 | | 9/2001 | Liao et al. | |
| 6,473,855 B1 | * | 10/2002 | Welder .............................. | 713/2 |
| 6,550,008 B1 | * | 4/2003 | Zhang et al. ................... | 713/155 |
| 6,571,279 B1 | * | 5/2003 | Herz et al. ...................... | 709/219 |
| 6,618,746 B2 | * | 9/2003 | Desai et al. ..................... | 709/204 |
| 6,686,880 B1 | | 2/2004 | Marko et al. | |
| 6,754,635 B1 | * | 6/2004 | Hamlin et al. .................. | 705/10 |
| 6,760,711 B1 | * | 7/2004 | Gillett et al. .................... | 705/64 |
| 6,760,916 B2 | * | 7/2004 | Holtz et al. .................... | 709/217 |
| 6,931,419 B1 | * | 8/2005 | Lindquist ....................... | 707/200 |
| 6,959,288 B1 | * | 10/2005 | Medina et al. .................. | 705/52 |

(Continued)

FOREIGN PATENT DOCUMENTS

EP    0 760 505 A2    3/1997

(Continued)

OTHER PUBLICATIONS

The Cell Phone Handbook: everything you wanted to know about wireless telephony; Stetz, Published May 10, 1999.*

(Continued)

*Primary Examiner* — Benjamin R Bruckart
(74) *Attorney, Agent, or Firm* — Oblon, Spivak, McClelland, Maier & Neustadt, L.L.P.

(57) ABSTRACT

An apparatus transfers the title of content to an ID-assigning unit which assigns an ID to the content and transmits the content ID to a broadcasting unit via a tagging unit. A broadcasting apparatus then broadcasts the content ID and a receiver extracts the content ID from a received signal and transfers the content ID to a verification unit which determines whether or not the content ID received from a reception functional unit matches a stored content ID. If the content ID received from the reception unit matches a stored content ID, user information of the receiver is transmitted to a privacy-guarding unit. The privacy-guarding unit searches privacy-guarding items and, in accordance with a result of the search, only necessary user information presented by the verification unit is transmitted to a provider unit.

8 Claims, 28 Drawing Sheets

U.S. PATENT DOCUMENTS

2003/0135464 A1* 7/2003 Mourad et al. ................. 705/50
2003/0172124 A1* 9/2003 Feinleib et al. ............... 709/217
2005/0071272 A1* 3/2005 Yoshioka et al. ............... 705/51

FOREIGN PATENT DOCUMENTS

| EP | 0 760 505 A3 | 3/1997 |
|---|---|---|
| JP | 10-91638 | 4/1988 |
| JP | 9-163344 | 6/1997 |
| JP | 11-224288 | 8/1999 |
| JP | 11-296490 | 10/1999 |
| JP | 2000-69452 | 3/2000 |
| JP | 2002112156 | 4/2002 |
| WO | WO 98/08344 A2 | 2/1998 |
| WO | WO 98/08344 A3 | 2/1998 |
| WO | WO 00/23926 | 4/2000 |

OTHER PUBLICATIONS

U.S. Appl. No. 09/811,516, filed Mar. 20, 2001, Hirayama.
U.S. Appl. No. 11/169,766, filed Jun. 30, 2005, Hirayama.

* cited by examiner

FIG. 12

DATABASE 43

| NO | CONTENT ID | VALIDITY CONDITION | PROVIDER ID | PROVIDER NETWORK ADDRESS | REMARKS (CONTENT TITLE) |
|---|---|---|---|---|---|
| 1 | 0001 | TABLE 0001 | Re0003 | www.cdshop.com | BEST SOUNDTRACK |
| 1 | 0002 | TABLE 0002 | Re0003 | www.cdshop.com | SYMPHONY NO. 5 |
| 1 | 0003 | TABLE 0003 | Re0004 | www.books.com | EDISON'S BIOGRAPHY |

| BROADCASTING REFERENCE ID | MEDIUM | CHANNEL | OUTPUT TIME |
|---|---|---|---|
| BC0011 | SATELLITE RADIO | 112 | 2:30 FOR 45 TO 55 SECONDS |
| BC0012 | SATELLITE RADIO | 134 | 3:35 FOR 15 TO 25 SECONDS |
| BC0023 | SATELLITE RADIO | 112 | 4:10 FOR 00 TO 30 SECONDS |

FIG. 13

TABLE OF VALIDITY CONDITIONS

| VALIDITY CONDITION | RESPONSE CONDITION OR RESPONSE DEADLINE | AGE RESTRICTION IN PROFILE INFORMATION | SUBSTANCE RESTRICTION IN PROFILE INFORMATION | RESPONSE CONDITION OR INDIVIDUAL AUTHENTICATION FUNCTION |
|---|---|---|---|---|
| 0001 | 23:59 ON 10/05/2001 | N/A | N/A | N/A |
| 0002 | 12:00 ON 11/30/2001 | AT LEAST 18 YEARS OLD | ADULT | ONLY REGISTERED PERSONS |
| 0003 | 23:59 ON 12/02/2001 | NONE | FOR CHILDREN | N/A |

| PAYMENT METHOD IN PROFILE INFORMATION | RESPONSE CONDITION OR OTHER AERIAL RESTRICTIONS IN THE NAVIGATION FUNCTION | ADDITIONAL-INFORMATION-INPUTTING PROMPT | INPUT 1 IN ADDITIONAL INFORMATION | INPUT 2 IN ADDITIONAL INFORMATION | RESPONSE CONDITION OR RESTRICTIONS ON ACCOUNT BALANCE |
|---|---|---|---|---|---|
| N/A | N/A | CHARACTER STRING X2 | ABC COLA | ABC MAN | N/A |
| JCB, VISA, AMEX | ALL US TERRITORIES EXCEPT ALASKA | N/A | N/A | N/A | N/A |
| CHECKS ONLY | ONLY CALIFORNIA | NUMBERS 1 TO 3 | 1 | N/A | AT LEAST 300 $ |

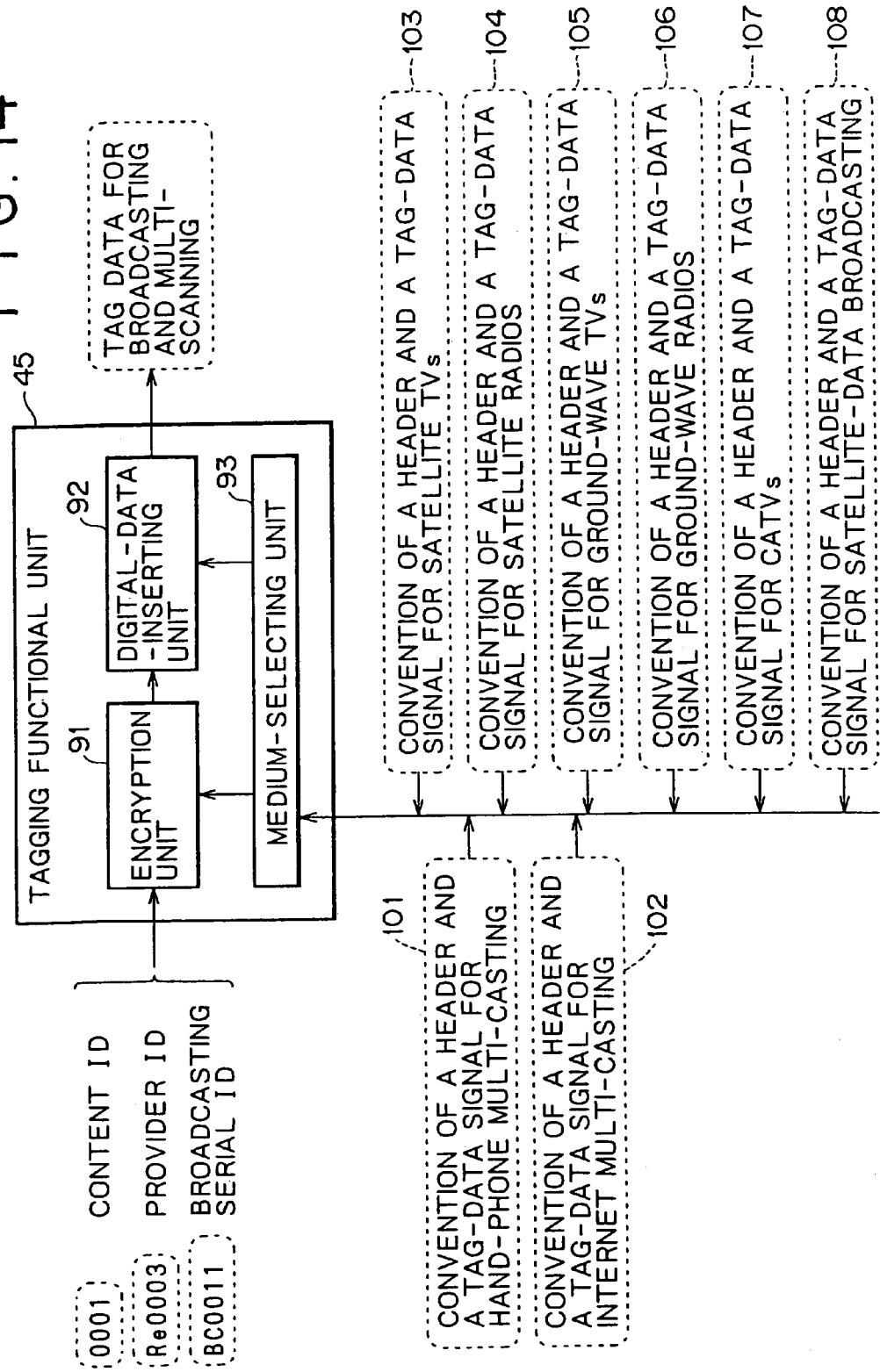

FIG. 17

PROFILE INFORMATION (EMBEDDED IN THE RECEIVER)

| ITEM NAMES IN PROFILE INFORMATION | CUSTOMER NUMBER | NAME | GENDER | CATALOGED ADDRESS | OCCUPATION |
|---|---|---|---|---|---|
| VALUES OF ITEM NAMES IN PROFILE INFORMATION | 046131 | JIRO YAMADA | MALE | 2-16-16 NISHI OHI SHINAGAWAKU | COMPANY EMPLOYEE |

| CATALOGED AREA | PAYMENT METHOD | AGE | CONTENTS |
|---|---|---|---|
| 6 PREFECTURES IN KANTO DISTRICT | VISA | 43 | EXCLUDING ADULTS |

FIG. 18

PROFILE INFORMATION IN THE DATABASE 49

| RECEIVER ID | CATALOGING DATE | NAME | GENDER | MODEL | CATALOGED ADDRESS | OCCUPATION |
|---|---|---|---|---|---|---|
| Ssny1003 | 06/06/2000 | JIRO YAMADA | MALE | TR-S55 | 2-16-16 NISHI OHI SHINAGAWAKU | COMPANY EMPLOYEE |

| CATALOGED AREA | PAYMENT METHOD | AGE | CONTENTS |
|---|---|---|---|
| 6 PREFECTURES IN KANTO DISTRICT | VISA | 43 | EXCLUDING ADULTS |

F I G. 19

TYPICAL CONTENTS OF THE RESPONSE CONDITION

| ITEM NAMES OF THE RESPONSE CONDITION | RESPONSE TIME AND DATE OF THE RESPONSE CONDITION | AUTHENTICATED PERSON OF THE RESPONSE CONDITION | DETECTED AREA BY NAVIGATION FUNCTION OF THE RESPONSE CONDITION | CURRENT ACCOUNT BALANCE OF THE RESPONSE CONDITION |
|---|---|---|---|---|
| ITEM VALUES OF THE RESPONSE CONDITION | 10:13 ON 10/03/2001 | CATALOGED PERSON | THE STATE OF CALIFORNIA | $ 342 |

FIG. 20

DATABASE 49

| RECEIVER ID | CATALOGING NAME | USER NAME | MODEL |
|---|---|---|---|
| Ssny 1001 | 06/05/2000 | TARO TANAKA | TR-S55 |
| Ssny 1003 | 06/06/2000 | JIRO YAMADA | TR-S55 |
| Ssny 1004 | 06/06/2000 | HANAKO SAITO | TR-S55 |

FIG. 22

| NAME | POSTAL ADDRESS | NETWORK ADDRESS | ACCOUNT-SETTLEMENT METHOD | CUSTOMER NUMBER |
|---|---|---|---|---|
| TOM HIRAYAMA | 1 Ssny Drive, Park Ridge, NJ | Hirayama@net.com | VISA 1234 5678 XXXX | C686853 |

GENDER AND OCCUPATION IN PROFILE INFORMATION

F I G. 26
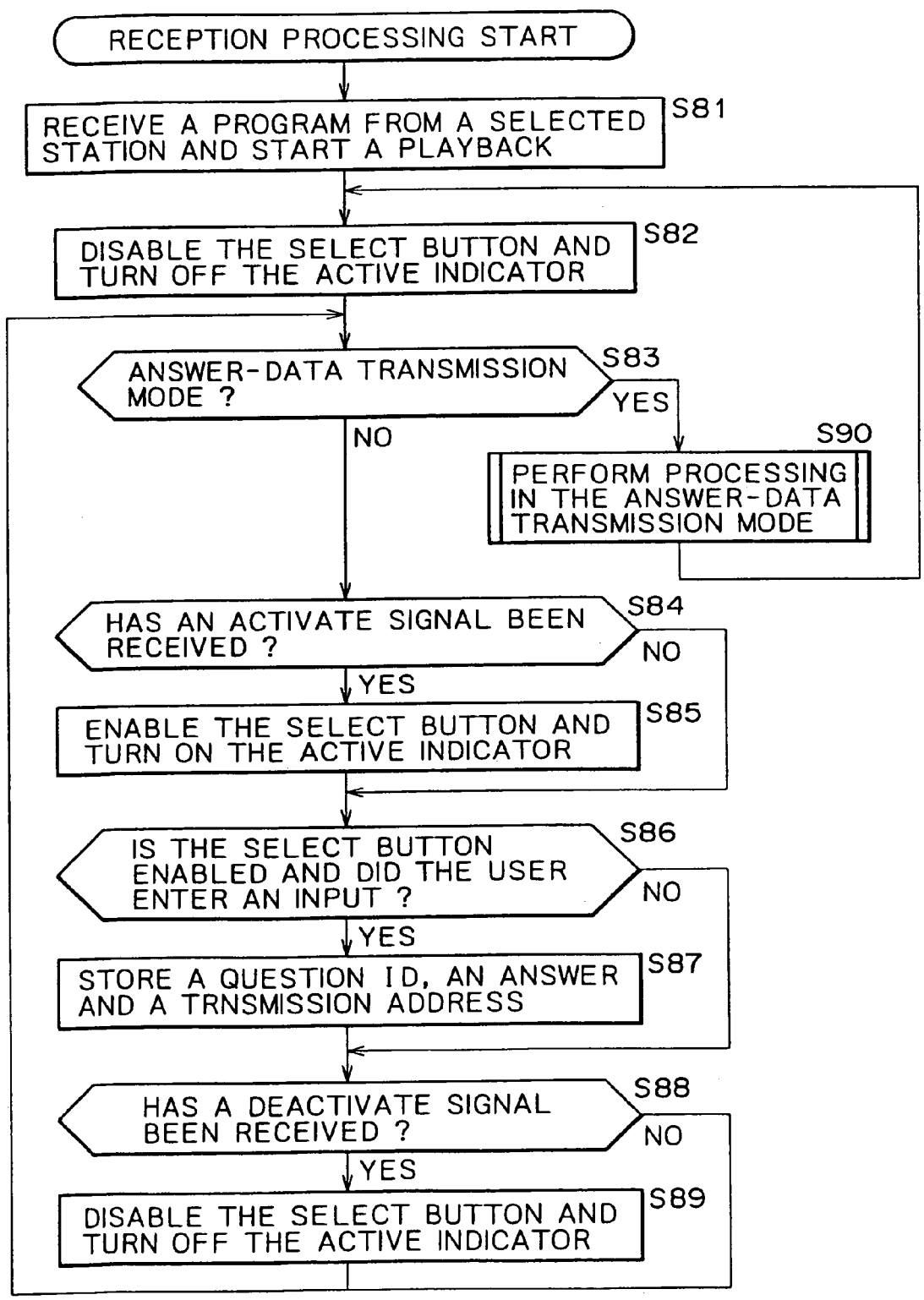

APPARATUS, SYSTEM AND METHOD FOR SECURE INFORMATION DISSEMINATION

CROSS-REFERENCE TO RELATED APPLICATIONS

This application is a divisional of U.S. patent application Ser. No. 09/810,188, filed Mar. 19, 2001, and further is based upon and claims the benefit of priority from the prior Japanese Patent Application No. 2000-077627, filed Mar. 21, 2000, the entire contents of each of which are incorporated herein by reference.

BACKGROUND OF THE INVENTION

The present invention relates to an information processing apparatus, an information processing method, an information processing system and a recording medium. More particularly, the present invention relates to an information processing apparatus, an information processing method, an information processing system and a recording medium that allow a content to be provided with a high degree of security through a network.

In recent years, there are more opportunities in which radio or television broadcasting provides the radio listener or the television watcher with information on commodities, information on services and a variety of contents. In this specification, the variety of contents are referred to simply as a content if it is not necessary to distinguish them from each other. Thus, a desired content can be presented to the radio listener or the television watcher speedily through the radio or television broadcasting.

In such a system, however, a content provider faces a problem of much labor and much time required for forming a judgment as to whether or not a request for a content made by the radio listener or the television watcher conforms to a correct form prescribed by the provider. In addition, it is feared that the radio listener or the television watcher making a request for presentation of a content does not have the capability of paying a fee for the content so that the provider cannot receive a payment from the listener or the watcher.

Moreover, the radio listener or the television watcher receiving a presented content must provide the content provider with personal information such as the name, the address, the age, the telephone number as well as a credit card number, and it is difficult to prevent the disclosed personal information from being abused. Furthermore, in most cases, the radio listener does not know what kind of enterprise the content provider is. Thus, while it is feared that the content provider presents a poor content or does not really have a presented content, the radio listener itself must run a risk accompanying the transaction.

SUMMARY OF THE INVENTION

It is therefore an object of the present invention addressing the problems described above to allow transactions to be closed speedily with a high degree of security by the content provider and the content recipient.

An information processing apparatus provided by the present invention is characterized in that the information processing apparatus comprises an acquisition means for acquiring information on a first information processing apparatus and information on a content presented by the first information processing apparatus from the first information processing apparatus, a generation means for generating information processing apparatus identification information for identifying the first information processing apparatus and generating content identification information for identifying a content on the basis of the information on the first information processing apparatus and the information on a content, which are acquired by the acquisition means, a storage means for storing the information processing apparatus identification information and the content identification information, which are generated by the generation means, by associating the information processing apparatus identification information with the content identification information and a transmission means for transmitting information on association stored in the storage means to a second information processing apparatus in response to a request made by the second information processing apparatus through a network.

It is possible to implement a configuration of the information processing apparatus wherein, if the information processing apparatus identification information and the content identification information are disseminated by broadcasting, the acquisition means further acquires broadcasting identification information (transmission identification information) assigned to the broadcasting, and the storage means further stores the broadcasting identification information (transmission identification information) by associating the broadcasting identification information (transmission identification information) with the information processing apparatus identification information and the content identification information.

It is possible to implement a configuration of the information processing apparatus wherein the storage means further stores the address of the first information processing apparatus in the network and is further provided with an access controlling means for controlling accesses made to the first information processing means through the network on the basis of any one of the information processing apparatus identification information, the content identification information and the broadcasting identification information (transmission identification information), which have been acquired from a third information processing apparatus.

It is possible to implement a configuration of the information processing apparatus wherein the acquisition means further acquires a validity-condition concerning validity of presentation of a content from the first information processing apparatus, whereas the storage means further stores the validity-condition by associating the validity-condition with the information processing apparatus identification information and the content identification information.

It is possible to implement a configuration of the information processing apparatus wherein the validity-condition includes information on additional information added by the user receiving data including the information processing apparatus identification information and the content identification information.

An information processing method provided by the present invention is characterized in that the information processing method comprises an acquisition step of acquiring information on a first information processing apparatus and information on a content presented by the first information processing apparatus from the first information processing apparatus, a generation step of generating information processing apparatus identification information for identifying the first information processing apparatus and generating content identification information for identifying a content on the basis of the information on a first information processing apparatus and the information on a content, which are acquired by the processing at the acquisition step, a storage step of storing the information processing apparatus identification information and the content identification information, which are generated by the processing at the generation step, by associating the information processing apparatus identification information with the content identification information and a transmission step of transmitting information on association stored by the processing at the storage step to a second information processing apparatus in response to a request made by the second information processing apparatus through a network.

A recording medium provided by the present invention is characterized in that a program recorded on the recording medium comprises an acquisition step of acquiring information on a first information processing apparatus and information on a content presented by the first information processing apparatus from the first information processing apparatus, a generation step of generating information processing apparatus identification information for identifying the first information processing apparatus and generating content identification information for identifying a content on the basis of the information on a first information processing apparatus and the information on a content, which are acquired by the processing at the acquisition step, a storage controlling step of controlling storage of the information processing apparatus identification information and the content identification information, which are generated by the processing at the generation step, by associating the information processing apparatus identification information with the content identification information and a transmission step of transmitting information on association stored by the processing at the storage controlling step to a second information processing apparatus in response to a request made by the second information processing apparatus through a network.

Another information processing apparatus provided by the present invention is characterized in that the information processing apparatus comprises an extraction means for extracting content identification information for identifying a content presented by a first information processing apparatus and first information processing apparatus identification information for identifying the first information processing apparatus from a received signal, a storage means for storing second information processing apparatus identification information for identifying the other information processing apparatus itself and a request means for transmitting the content identification information and the first information processing apparatus identification information, which are extracted by the extraction means, along with the second information processing apparatus identification information stored in the storage means to a second information processing apparatus so as to request the first information processing apparatus to present a content identified by the content identification information.

It is possible to implement a configuration of the other information processing apparatus wherein the other information processing apparatus further includes a transfer means for transferring the second information processing apparatus identification information in advance to the second information processing apparatus for storing the second information processing apparatus identification information.

It is possible to implement a configuration of the other information processing apparatus wherein the extraction means is further provided with an acquisition means for further extracting additional related information related to additional data added by a user and acquiring the additional data related to the additional related information.

It is possible to implement a configuration of the other information processing apparatus wherein, if the first information processing apparatus identification information and the content identification information are disseminated by broadcasting, the extraction means further extracts broadcasting identification information assigned to the broadcasting, and the storage means further stores the broadcasting identification information (transmission identification information) by associating the broadcasting identification information (transmission identification information) with the first information processing apparatus identification information and the content identification information.

Another information processing method provided by the present invention is characterized in that the information processing method comprises an extraction step of extracting content identification information for identifying a content presented by a first information processing apparatus and first information processing apparatus identification information for identifying the first information processing apparatus from a received signal, storage step of storing second information processing apparatus identification information for identifying an information processing apparatus adopting the other information processing method itself and a request step of transmitting the content identification information and the first information processing apparatus identification information, which are extracted by the processing at the extraction step, along with the second information processing apparatus identification information stored by the processing at the storage step to a second information processing apparatus so as to request the first information processing apparatus to present a content identified by the content identification information.

Another recording medium provided by the present invention is characterized in that a program recorded on the recording medium comprises an extraction step of extracting content identification information for identifying a content presented by a first information processing apparatus and first information processing apparatus identification information for identifying the first information processing apparatus from a received signal, storage step of storing second information processing apparatus identification information for identifying an information processing apparatus executing the program itself and a request step of transmitting the content identification information and the first information processing apparatus identification information, which are extracted by the processing at the extraction step, along with the second information processing apparatus identification information stored by the processing at the storage step to a second information processing apparatus so as to request the first information processing apparatus to present a content identified by the content identification information.

A further information processing apparatus provided by the present invention is characterized in that the information processing apparatus comprises a first acquisition means for acquiring content identification information for identifying a content presented by a first information processing apparatus, first information processing apparatus identification information for identifying the first information processing apparatus and second information processing apparatus identification information for identifying a second information processing apparatus from the second information identifying apparatus, a judgment means for forming a judgment on validity of the content identification information, the first information processing apparatus identification information and the second information processing apparatus identification information which are acquired by the first acquisition means, a second acquisition means for acquiring user information on a user of the second information processing apparatus and an output means for outputting the user information acquired by the second acquisition means in conformity with a result of the judgment formed by the judgment means as information for receiving a presented content identified by the content identification information.

It is possible to implement a configuration of the further information processing apparatus wherein, if the first information processing apparatus identification information and the content identification information are disseminated by broadcasting, the first acquisition means further acquires broadcasting identification information (transmission identification information) assigned to the broadcasting, and the judgment means further forms a judgment on validity of the content identification information, the first information processing apparatus identification information, the second information processing apparatus identification information and the broadcasting identification information (transmission identification information).

It is possible to implement a configuration of the further information processing apparatus wherein the first acquisition means further acquires additional information and the judgment means further forms a judgment on validity of the additional information.

It is possible to implement a configuration of the further information processing apparatus wherein there is further included an assignment means for assigning customer identification information for identifying a customer to the content identification information, the first information processing apparatus identification information and the second information processing apparatus identification information.

It is possible to implement a configuration of the further information processing apparatus wherein the output means outputs the customer identification information instead of outputting the second information processing apparatus identification information among pieces of information for receiving the content.

It is possible to implement a configuration of the further information processing apparatus wherein there is further included a request means for requesting the first information processing apparatus to present a content identified by the content identification information through a network instead of requesting the second information processing apparatus.

It is possible to implement a configuration of the further information processing apparatus wherein there is further included a presentation means for directly or indirectly presenting a content identified by the content identification information to the second information processing apparatus in place of the first information processing apparatus.

A further information processing method provided by the present invention is characterized in that the information processing method comprises a first acquisition controlling step of controlling acquisition, from the second information identifying apparatus, of content identification information for identifying a content presented by a first information processing apparatus, first information processing apparatus identification information for identifying the first information processing apparatus and second information processing apparatus identification information for identifying a second information processing apparatus, a judgment step of forming a judgment on validity of the content identification information, the first information processing apparatus identification information and the second information processing apparatus identification information, whose acquisition is controlled by the processing at the first acquisition controlling step, a second acquisition controlling step of controlling acquisition of user information on a user of the second information processing apparatus and an output step of outputting the user information, whose acquisition is controlled by the processing at the second acquisition controlling step in conformity with a result of the judgment formed by the processing at the judgment step as information for receiving the content identified by the content identification information.

A further recording medium provided by the present invention is characterized in that a program recorded on the recording medium comprises a first acquisition controlling step of controlling acquisition, from the second information identifying apparatus, of content identification information for identifying a content presented by a first information processing apparatus, first information processing apparatus identification information for identifying the first information processing apparatus and second information processing apparatus identification information for identifying a second information processing apparatus, a judgment step of forming a judgment on validity of the content identification information, the first information processing apparatus identification information and the second information processing apparatus identification information, whose acquisition is controlled by the processing at the first acquisition controlling step, a second acquisition controlling step of controlling acquisition of user information on a user of the second information processing apparatus and an output step of outputting the user information, whose acquisition is controlled by the processing at the second acquisition controlling step in conformity with a result of the judgment formed by the processing at the judgment step as information for receiving the content identified by the content identification information.

A still further information processing apparatus provided by the present invention is characterized in that the information processing apparatus comprises an acquisition means for acquiring content identification information for identifying a content, first information processing apparatus identification information for identifying a first information processing apparatus and second information processing apparatus identification information for identifying a second information processing apparatus to receive a presented content, an assignment means for assigning customer identification information for identifying a customer to the content identification information, the first information processing apparatus identification information and the second information processing apparatus identification information, a request means for requesting the first information processing apparatus to present a content identified by the content identification information through a network instead of requesting the second information processing apparatus and an output means for outputting customer identification information to the first information processing apparatus through the network as information for receiving the content instead of outputting the second information processing apparatus identification information.

It is possible to implement a configuration of the still further information processing apparatus wherein there is further included a presentation means for directly or indirectly presenting a content identified by the content identification information to the second information processing apparatus in place of the first information processing apparatus.

A still further information processing method provided by the present invention is characterized in that the information processing method comprises an acquisition controlling step of controlling acquisition of content identification information for identifying a content, first information processing apparatus identification information for identifying a first information processing apparatus and second information processing apparatus identification information for identifying a second information processing apparatus to receive a presented content, an assignment step of assigning customer identification information for identifying a customer to the content identification information, the first information processing apparatus identification information and the second information processing apparatus identification information, a request step of requesting the first information processing apparatus to present a content identified by the content identification information through a network instead of requesting the second information processing apparatus and output step of outputting customer identification information to the first information processing apparatus through the network as information for receiving the content instead of outputting the second information processing apparatus identification information.

A still further recording medium provided by the present invention is characterized in that a program recorded on the recording medium comprises an acquisition controlling step of controlling acquisition of content identification information for identifying a content, first information processing apparatus identification information for identifying a first information processing apparatus and second information processing apparatus identification information for identifying a second information processing apparatus to receive the content, an assignment step of assigning customer identification information for identifying a customer to the content identification information, the first information processing apparatus identification information and the second information processing apparatus identification information, a request step of requesting the first information processing apparatus to present a content identified by the content identification information through a network instead of requesting the second information processing apparatus and output step of outputting customer identification information to the first information processing apparatus through the network as information for receiving a presented content instead of outputting the second information processing apparatus identification information.

An information processing system provided by the present invention is characterized in that the information processing system includes a second information processing apparatus comprising, a first acquisition means for acquiring information on a first information processing apparatus and information on a content presented by the first information processing apparatus from the first information processing apparatus, a generation means for generating first information processing apparatus identification information for identifying the first information processing apparatus and generating content identification information for identifying a content on the basis of the information on the first information processing apparatus and the information on a content, which are acquired by the first acquisition means, a first storage means for storing the first information processing apparatus identification information and the content identification information, which are generated by the generation means, by associating the information processing apparatus identification information with the content identification information, a first output means for directly or indirectly outputting the first information processing apparatus identification information and the content identification information, which are stored in the first storage means, to a third information processing apparatus and a transmission means for transmitting information on association stored in the first storage means to a fourth information processing apparatus in response to a request made by the fourth information processing apparatus through a network, the third information processing means comprising an extraction means for extracting the content identification information and the first information processing apparatus identification information from a received signal, a second storage means for storing second information processing apparatus identification information for identifying the third information processing apparatus itself and a request means for transmitting the content identification information and the first information processing apparatus identification information, which are extracted by the extraction means, along with the second information processing apparatus identification information stored in the second storage means to a fourth information processing apparatus so as to request the first information processing apparatus to present a content identified by the content identification information, and the fourth information processing means comprising a second acquisition means for acquiring the content identification information, the first information processing apparatus identification information and the second information processing apparatus identification information from the third information processing apparatus, a judgment means for forming a judgment on validity of the content identification information, the first information processing apparatus identification information and the second information processing apparatus identification information which are acquired by the second acquisition means, a third acquisition means for acquiring user information on a user of the third information processing apparatus and a second output means for outputting the user information acquired by the third acquisition means in conformity with a result of the judgment formed by the judgment means as information for receiving the content identified by the content identification information.

A still other information processing method provided by the present invention is characterized in that the information processing method includes an information processing method for a second information processing apparatus comprising a first acquisition controlling step of controlling acquisition, from the first information processing apparatus, of information on a first information processing apparatus and information on a content presented by the first information processing apparatus, a generation step of generating first information processing apparatus identification information for identifying the first information processing apparatus and generating content identification information for identifying a content on the basis of the information on the first information processing apparatus and the information on a content, whose acquisition is controlled by the processing at the first acquisition controlling step, a first storage controlling step of controlling storage of the first information processing apparatus identification information and the content identification information, which are generated by the processing at the generation step, by associating the information processing apparatus identification information with the content identification information, a first output controlling step of directly or indirectly controlling output of the first information processing apparatus identification information and the content identification information, whose storage is controlled by the processing at the first storage controlling step, to a third information processing apparatus and a transmission controlling step of controlling transmission of information on association, whose storage is controlled by the processing at the first storage controlling step to a fourth information processing apparatus in response to a request made by the fourth information processing apparatus through a network, an information processing method for the third information processing apparatus comprising an extraction controlling step of controlling extraction of the content identification information and the first information processing apparatus identification information from a received signal, a second storage controlling step of controlling storage of second information processing apparatus identification information for identifying the third information processing apparatus itself and a request step of transmitting the content identification information and the first information processing apparatus identification information, whose extraction is controlled by the processing at the extraction controlling step, along with the second information processing apparatus identification information, whose storage is controlled by the processing at the second storage controlling step to a fourth information processing apparatus so as to request the first information processing apparatus to present a content identified by the content identification information, and the an information processing method for fourth information processing apparatus comprising a second acquisition controlling step of controlling acquisition of the content identification information, the first information processing apparatus identification information and the second information processing apparatus identification information from the third information processing apparatus, a judgment step of forming a judgment on validity of the content identification information, the first information processing apparatus identification information and the second information processing apparatus identification information, whose acquisition is controlled by the processing at the second acquisition controlling step, a third acquisition controlling step of controlling acquisition of user information on a user of the third information processing apparatus and a second output controlling step of controlling output of the user information, whose acquisition is controlled by the processing at the third acquisition controlling step in conformity with a result of the judgment formed by the processing at the judgment step as information for receiving a presented content identified by the content identification information.

A still other recording medium provided by the present invention is characterized in that a program recorded on the recording medium comprises an information processing method for a second information processing apparatus comprising a first acquisition controlling step of controlling acquiring of information on a first information processing apparatus and information on a content presented by the first information processing apparatus from the first information processing apparatus, a generation step of generating first information processing apparatus identification information for identifying the first information processing apparatus and generating content identification information for identifying a content on the basis of the information on the first information processing apparatus and the information on a content, whose acquisition is controlled by the processing at the first acquisition controlling step, a first storage controlling step of controlling storage of the first information processing apparatus identification information and the content identification information, which are generated by the processing at the generation step, by associating the information processing apparatus identification information with the content identification information, a first output controlling step of directly or indirectly controlling output of the first information processing apparatus identification information and the content identification information, whose storage is controlled by the processing at the first storage controlling step, to a third information processing apparatus and a transmission controlling step of controlling transmission of information on association, whose storage is controlled by the processing at the first storage controlling step to a fourth information processing apparatus in response to a request made by the fourth information processing apparatus through a network, an information processing method for the third information processing apparatus comprising an extraction controlling step of controlling extraction of the content identification information and the first information processing apparatus identification information from a received signal, a second storage controlling step of controlling storage second information processing apparatus identification information for identifying the third information processing apparatus itself and a request step of transmitting the content identification information and the first information processing apparatus identification information, whose extraction is controlled by the processing at the extraction controlling step, along with the second information processing apparatus identification information, whose storage is controlled by the processing at the second storage controlling step to a fourth information processing apparatus so as to request the first information processing apparatus to present a content identified by the content identification information and the an information processing method for fourth information processing apparatus comprising, a second acquisition controlling step of controlling acquisition of the content identification information, the first information processing apparatus identification information and the second information processing apparatus identification information from the third information processing apparatus, a judgment step of forming a judgment on validity of the content identification information, the first information processing apparatus identification information and the second information processing apparatus identification information, whose acquisition is controlled by the processing at the second acquisition controlling step, a third acquisition controlling step of controlling acquisition of user information on a user of the third information processing apparatus and a second output controlling step of controlling output of the user information, whose acquisition is controlled by the processing at the third acquisition controlling step in conformity with a result of the judgment formed by the processing at the judgment step as information for receiving a presented content identified by the content identification information.

In the information processing apparatus as well as the information processing method, which are provided by the invention, and the program recorded on the recording medium also provided by the invention, information on a relation between stored content identification information and stored information processing apparatus identification information is transmitted to the second information processing apparatus at a request made by the second information processing apparatus by way of network.

In the other information processing apparatus as well as the other information processing method, which are provided by the invention, and the program recorded on the other recording medium also provided by the invention, extracted content identification information and first information processing apparatus identification information are transmitted to the second information processing apparatus along with second information processing apparatus identification information so as to make a request for presentation of a content identified by the content identification information.

In the further information processing apparatus as well as the further information processing method, which are provided by the invention, and the program recorded on the further recording medium also provided by the invention, user information is output in conformity with a result of a judgment on validity of acquired content identification information, first information processing apparatus identification information and second information processing apparatus identification information as information for receiving a presented content identified by the content identification information.

In the still further information processing apparatus as well as the still further information processing method, which are provided by the invention, and the program recorded on the still further recording medium also provided by the invention, customer identification information assigned to content identification information, first information processing apparatus identification information and second information processing apparatus identification information is output to the first information processing apparatus through the network as information for receiving a presented content instead of outputting the second information processing apparatus identification information.

In the information processing system as well as the still other information processing method, which are provided by the invention, and the program recorded on the still other recording medium also provided by the invention, the second information processing apparatus stores first information processing apparatus identification information and content identification information by associating the information processing apparatus identification information with the content identification information directly or indirectly outputs the first information processing apparatus identification information and the content identification information to the third information processing apparatus and transmits stored information on association to the fourth information processing apparatus in response to a request made by the fourth information processing apparatus. The third information processing apparatus transmits the content identification information and the first information processing apparatus identification information, which are extracted from a signal received from the second information processing apparatus, to a fourth information processing apparatus along with the second information processing apparatus identification information so as to request the first information processing apparatus to present a content identified by the content identification information. The fourth information processing apparatus forms a judgment on validity of the content identification information, the first information processing apparatus identification information and the second information processing apparatus identification information and outputs stored user information in conformity with a result of the judgment as information for receiving a presented content identified by the content identification information.

In accordance with an information processing apparatus as well as an information processing method, which are provided by the present invention, and a program recorded on a recording medium also provided by the present invention, content identification information and information processing apparatus identification information are recorded by associating one information with the other. When a second information processing apparatus makes a request for stored information, the stored information is transmitted to the second information processing apparatus. It is thus possible to render a service allowing the second information processing apparatus to identify a presented content.

In accordance with another information processing apparatus as well as another information processing method, which are provided by the present invention, and a program recorded on another recording medium also provided by the present invention, extracted content identification information and first information processing apparatus identification information are transmitted to a second information processing apparatus along with second information processing apparatus identification information as a request for presentation of a content issued to a first information processing apparatus. Thus, a presented content can be received in a simple way and with a high degree of security.

In accordance with a further information processing apparatus as well as a further information processing method, which are provided by the present invention, and a program recorded on a further recording medium also provided by the present invention, a judgment is formed on validity of content identification information, first information processing apparatus identification information and second information processing apparatus identification information, whereas stored user information is output in conformity with a result of the judgment. It is thus possible to render a service of providing the user with a content with a high degree of security.

In accordance with a still further information processing apparatus as well as a still further information processing method, which are provided by the present invention, and a program recorded on a still further recording medium also provided by the present invention, customer identification information for identifying a customer is assigned to content identification information, first information processing apparatus identification information and second information processing apparatus identification information, and the customer identification information is output to a first information processing apparatus for presenting a content as information for receiving a presented content instead of outputting the second information processing apparatus identification information. As a result, a content can be provided by the first information processing apparatus and received by a customer by hiding the first information processing apparatus and the second information processing apparatus from each other.

In accordance with an information processing system as well as a still other information processing method, which are provided by the present invention, and a program recorded on a still other recording medium also provided by the present invention, a second information processing apparatus generates content identification information for identifying a content presented from the first information. A third information processing apparatus transmits a content identification information extracted from a received signal to a fourth information processing apparatus so as to request a first information processing apparatus to present a content identified by the content identification information, and the fourth information processing apparatus forms a judgment on validity of the content identification information received from the third information processing apparatus and outputs information on a user operating the third information processing apparatus as information for receiving a presented content in accordance with a result of the judgment. As a result, it is possible to implement a system wherein the first information processing apparatus is capable of presenting a content to the third information processing apparatus with a high degree of security.

BRIEF DESCRIPTION OF THE DRAWINGS

FIG. 12 is an explanatory diagram showing information stored in a database employed in an ID-assigning functional unit employed in the information processing system shown in FIG. 2.

FIG. 13 is a diagram showing a typical validity-condition.

FIG. 14 is an explanatory diagram showing a more detailed functions of a tagging functional unit employed in the information processing system shown in FIG. 2.

FIG. 17 is an explanatory diagram showing profile-information stored in a reception functional unit employed in the information processing system shown in FIG. 2.

FIG. 18 is an explanatory diagram showing typical information stored in a database of a receiver-management functional unit employed in the information processing system shown in FIG. 2.

FIG. 19 is an explanatory diagram showing a response condition.

FIG. 20 is an explanatory diagram showing other information stored in the database of the receiver-management functional unit employed in the information processing system shown in FIG. 2.

FIG. 22 is an explanatory diagram showing information stored in a database of the privacy-guarding functional unit employed in the information processing system shown in FIG. 2.

FIG. 26 is a flowchart used for explaining reception processing carried out by the receiver shown in FIG. 24.

DETAILED DESCRIPTION OF THE PREFERRED EMBODIMENT

Figure 1:
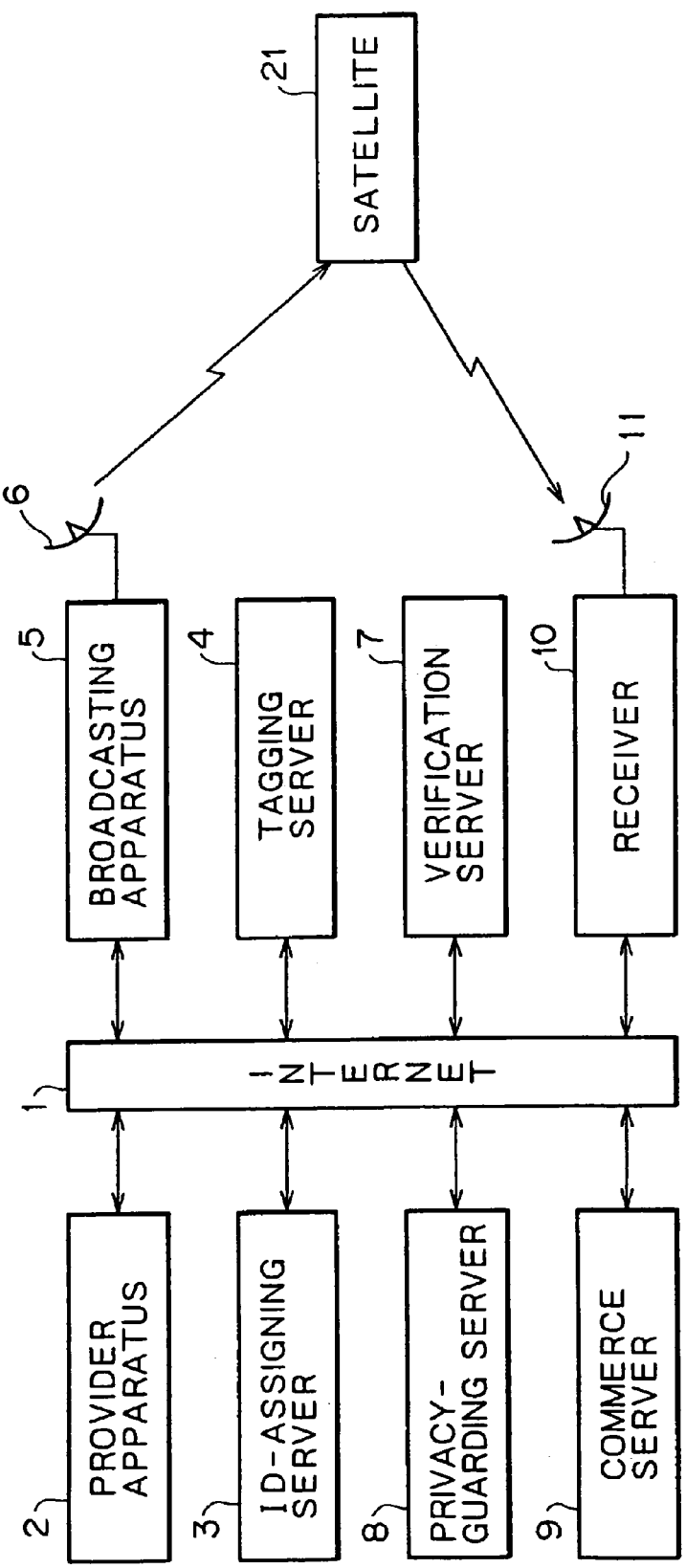
FIG. 1 is a block diagram showing a typical configuration of an information processing system provided by the present invention.

FIG. 1 is a diagram showing a typical configuration of an information processing system provided by the present invention. In this typical configuration, a provider apparatus 2, an ID-assigning server 3, a tagging server 4, a broadcasting apparatus 5, a verification server 7, a privacy-guarding server 8, a commerce server 9 and a receiver 10 are connected to the Internet 1. It should be noted, however, that if the receiver 10 is not a receiver used at home, that is, if the receiver 10 is a portable receiver or a receiver mounted on a vehicle, the receiver 10 can be connected to the verification server 7 by a radio network. The broadcasting apparatus 5 transmits a broadcast electric wave from an antenna 6 to a satellite 21. On the other hand, the receiver 10 receives an electric wave from the satellite 21 by using an antenna 11.

A provider providing contents, the administrators of the ID-assigning server 3, the tagging server 4, the broadcasting apparatus 5, the verification server 7, the privacy-guarding server 8 and the commerce server 9 make contracts with each other, each pay a predetermined amount of security money and each request that predetermined pieces of processing be carried out.

It should be noted that the network can of course be other than the Internet 1.

In addition, it is needless to say that transmission from the broadcasting apparatus 5 to the receiver 10 can be implemented by using communication media other than the satellite 21. Examples of the other communication media are ground-wave broadcasting, broadcasting through a cable, the Internet, a pager system and broadcasting by adoption of a multi-casting means using hand-phone lines.

Figure 2:
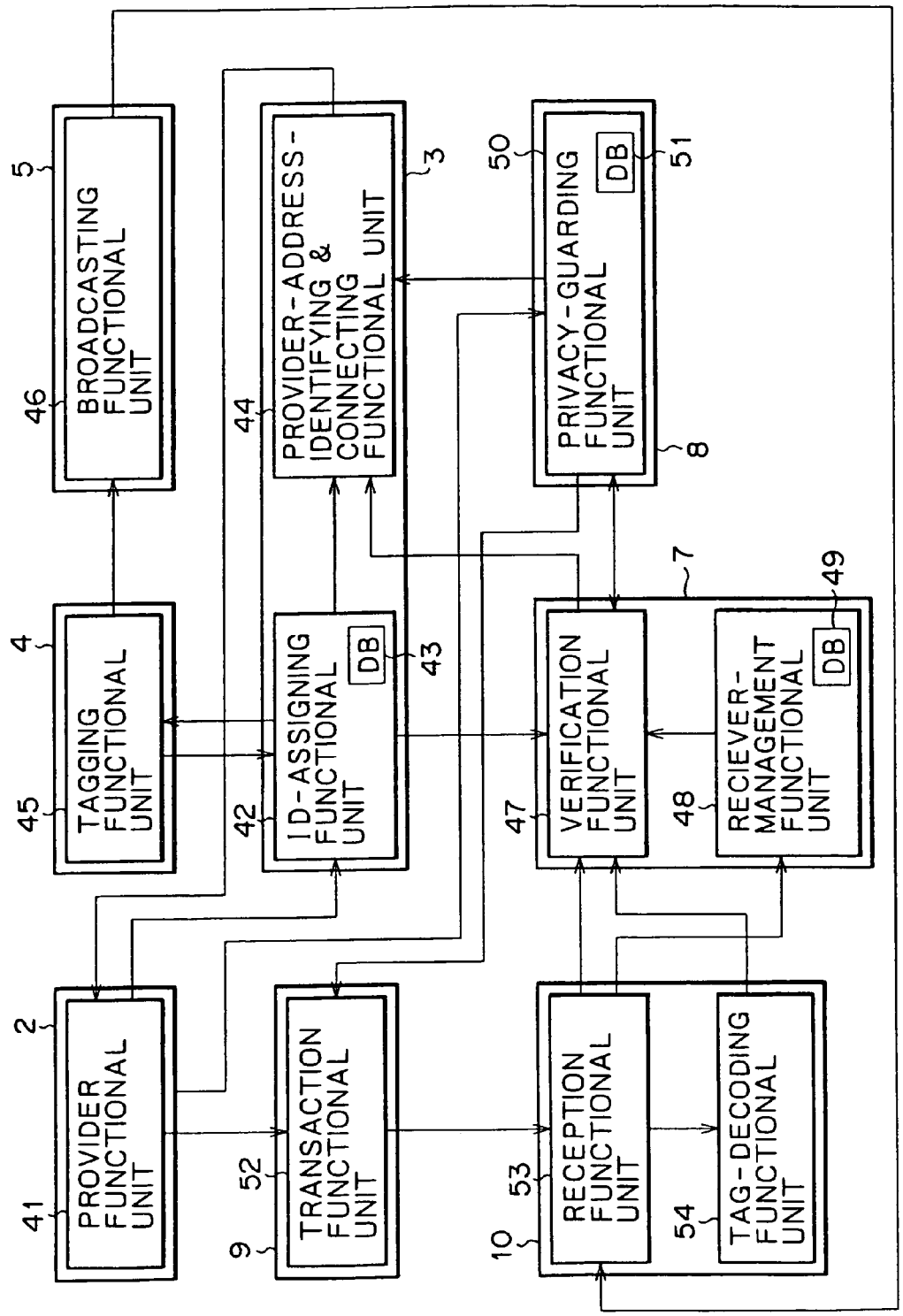
FIG. 2 is a block diagram showing the configuration of functional elements employed in the information processing system of FIG. 1.

FIG. 2 is a functional block diagram showing the elements employed in the information processing system of FIG. 1, from the provider apparatus 2 to the receiver 10. As shown in FIG. 2, the provider apparatus 2 owned by a provider providing contents has a provider functional unit 41. The provider functional unit 41 has information used for introducing contents provided by the provider to typically the listener listening to a radio broadcast. The information includes a provider name, that is, the name of the provider, the network address of the content provider and a presented content name, that is, the title of a presented content. The network address of the content provider is used by the listener to make an access to the provider through the Internet 1.

The provider functional unit 41 also holds a validity-condition, which is a condition for presenting a content provided by the provider. The validity-condition includes an additional-information-inputting prompt for prescribing additional information to be entered by the listener. The additional information is information such as a string of characters or a number specified individually by the user. The additional information can be a response to a quiz, a response to a questionnaire, a number of a lottery, a password or the name of a commodity which is mentioned by the listener listening to a radio program. The provider functional unit 41 carries out processing to provide a content at a request made by a content recipient.

The ID-assigning server 3 has an ID-assigning functional unit 42 and a provider-address-identifying & connecting functional unit 44. When receiving the name of a provider, the network address of the provider, the title of a content and a validity-condition including the additional-information-inputting prompt from the provider functional unit 41, the ID-assigning functional unit 42 assigns a provider ID for identifying the content provider to the provider and assigns a content ID for identifying the content to the title of the content. The ID-assigning functional unit 42 stores the name of the provider, the network address of the provider, the title of the content, the provider ID, the content ID and the validity-condition in a database 43 by associating one with another.

The provider-address-identifying & connecting functional unit 44 identifies a content provider's network address corresponding to a provider ID supplied by a privacy-guarding functional unit 50 on the basis of information received from the ID-assigning functional unit 42, and carries out processing to make an access, by way of network, to a provider functional unit 41 identified by the network address of the content provider.

The tagging server 4 has a tagging functional unit 45. When receiving a provider ID, a content ID and the additional-information-inputting prompt included in a validity-condition from the ID-assigning functional unit 42, the tagging functional unit 45 adds a broadcasting reference ID to the provider ID, the content ID and the additional-information-inputting prompt. The broadcasting reference number shows information related to broadcasting of the provider ID, the content ID and the additional-information-inputting prompt. The information includes an order, media, a date and time and a channel of the broadcasting. The tagging functional unit 45 supplies this broadcasting reference ID to the ID-assigning functional unit 42 and stores the provider ID and the content ID in the database 43. The tagging functional unit 45 further encodes the provider ID, the content ID, the additional-information-inputting prompt and the broadcasting reference ID into tag codes having a format suitable for broadcasting from the broadcasting apparatus 5 by way of the satellite 21 in a tag coding process. The tagging functional unit 45 supplies the tag codes to the broadcasting apparatus 5 by way of the Internet 1.

The broadcasting apparatus 5 has a broadcasting functional unit 46 for broadcasting the tag codes received from the tagging functional unit 45 employed in the tagging server 4 to the receiver 10 by way of the antenna 6 and the satellite 21.

The tag codes may be broadcasted by transmission other than the digital radio broadcasting through the satellite 21. Examples of such transmission are digital television broadcasting through a satellite, ground-wave digital television broadcasting, ground-wave digital radio broadcasting, transmission through a digital CATV network, transmission through a pager data broadcasting network, Internet multi-casting transmission and hand-phone multi-casting transmission. In this case, the tagging functional unit 45 carries out processing to convert the format of the tag codes into a format of the transmission.

The receiver 10 comprises a reception functional unit 53 and a tag-decoding functional unit 54. The reception functional unit 53 receives digital broadcast data broadcasted by the broadcasting functional unit 46, and extracts tag-data from the digital broadcast data. The reception functional unit 53 also forms a judgment as to whether the extracted tag-data is valid or invalid. If the extracted tag-data is determined to be valid, the reception functional unit 53 supplies the data to the tag-decoding functional unit 54. If the extracted tag-data is determined to be invalid, on the other hand, the reception functional unit 53 informs the user of the invalidity.

In addition, the reception functional unit 53 stores a receiver-ID for identifying the receiver 10 and personal information (or profile-information) of a user (or a listener) such as the name of the user, the postal address of the user and the age of the user. If necessary, the reception functional unit 53 transmits the receiver-ID and the personal information to a receiver-management functional unit 48 employed in the verification server 7 in advance to be stored in a database 49. That is to say, the user makes a contract with the administrators of the verification server 7 and has the information on the user itself stored in the database 49.

The tag-decoding functional unit 54 decodes tag-data received from the reception functional unit 53, and extracts a provider ID, a content ID, an additional-information-inputting prompt as well as a broadcasting reference ID. In addition, the tag-decoding functional unit 54 stores additional information entered by the content recipient in response to typically an inquiry made by the content provider. For the additional information entered by the content recipient, the tag-decoding functional unit 54 also generates a dynamically varying condition (information) as a response condition to be transmitted to a verification functional unit 47 employed in the verification server 7. To put it concretely, the dynamically varying condition is information on the user such as a time the additional information is entered and the name of a person entering the additional information.

The verification server 7 has the verification functional unit 47 and the receiver-management functional unit 48. When receiving a provider ID, a content ID and a broadcasting reference ID from the tag-decoding functional unit 54, the verification functional unit 47 examines the database 43 of the ID-assigning functional unit 42 to determine whether or not associated data is stored therein. In addition, the verification functional unit 47 also determines whether a receiver-ID received from the reception functional unit 53 is valid or invalid. The verification functional unit 47 also determines whether or not a response condition received from the tag-decoding functional unit 54 matches a validity-condition stored in the ID-assigning functional unit 42 in advance.

The receiver-management functional unit 48 stores the receiver-ID of the receiver 10 and profile-information (personal information) of the user, which are received from the reception functional unit 53 in advance, in the database 49 for management purposes.

The privacy-guarding server 8 includes the privacy-guarding functional unit 50. When privacy protection is selected in accordance with additional information entered by the content recipient to the tag-decoding functional unit 54 and the privacy protection is approved in accordance with a validity-condition stored in the database 43 of the ID-assigning functional unit 42 by the provider functional unit 41, the privacy-guarding functional unit 50 assigns a temporary customer number to the receiver-ID of the receiver 10 in case there is a request for presentation of a content identified by a content ID from the verification functional unit 47. An approval of privacy protection indicates that the use of a privacy-guarding function is agreed on by both the content provider providing a content and the content recipient receiving the content. Then, the privacy-guarding functional unit 50 supplies profile-information in a range approved in accordance with a response condition on the user side and a validity-condition on the provider side to the provider-address-identifying & connecting functional unit 44 employed in the ID-assigning server 3 along with the provider ID, the content ID and the customer number.

The commerce server 9 has the transaction functional unit 52. The transaction functional unit 52 supplies a content identified by a content ID specified by the reception functional unit 53 (or the user) at a request made by the provider functional unit 41 or a request made by the privacy-guarding functional unit 50.

Figure 3:
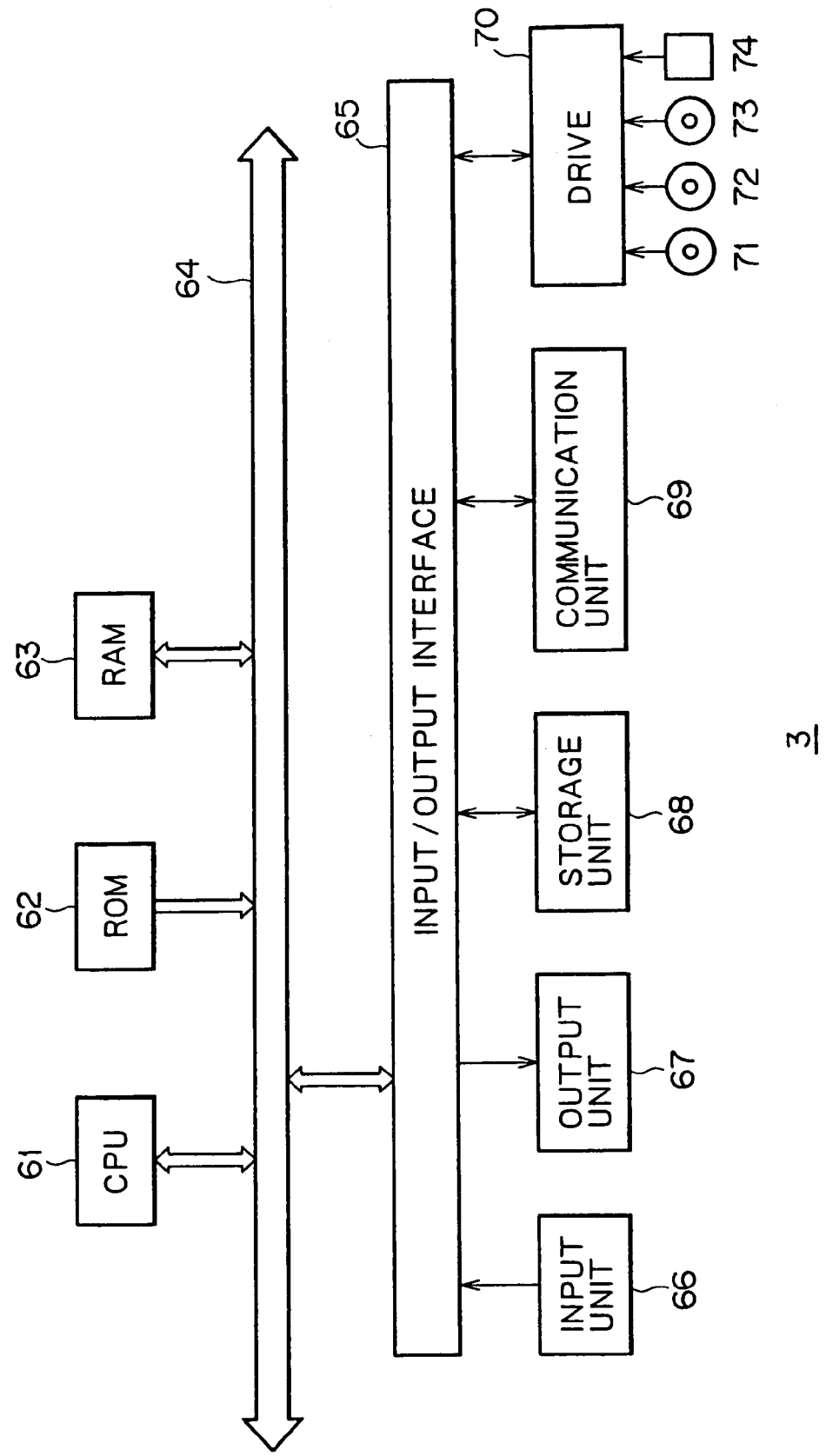
FIG. 3 is a block diagram showing a typical configuration of a ID-assigning server employed in the information processing system of FIG. 1.

FIG. 3 is a diagram showing a typical configuration of the ID-assigning server 3. A CPU (Central Processing Unit) 61 carries out various kinds of processing by execution of a program stored in a ROM (Read Only Memory) 62 in advance or a program loaded into a RAM (Random Access Memory) 63 from a storage unit 68. The RAM 63 is also used for storing data required during the execution of the various kinds of processing by the CPU 61.

As shown in the figure, the CPU 61, the ROM 62 and the RAM 63 are connected to each other by a bus 64. An input/output interface 65 is also connected to the bus 64.

The input/output interface 65 is connected to an input unit 66 including a keyboard and a mouse, an output unit 67 including a display unit such as a CRT or an LCD and a speaker, a storage unit 68 such as a hard disk and a communication unit 69 including a modem and a terminal adapter. The communication unit 69 carries out communications with other apparatuses through the Internet 1.

If necessary, the input/output interface 65 is also connected to a drive 70 for driving a memory device such as a magnetic disk 71, an optical disk 72, a magnetic optical disk 73 or a semiconductor memory 74. A program can be read out from such a memory device and installed into the storage unit 68 when needed.

It should be noted that the other servers each have basically the same configuration as the ID-assigning server 3 even though the configurations of the other servers are shown in none of the figures. The broadcasting apparatus 5 communicates with the communication unit 69 through the antenna 6 and the satellite 21. The configuration of the receiver 10 will be explained later by referring to FIG. 23.

Operations are described by referring to a flowchart shown in FIGS. 4 to 11 as follows.

Figure 4:
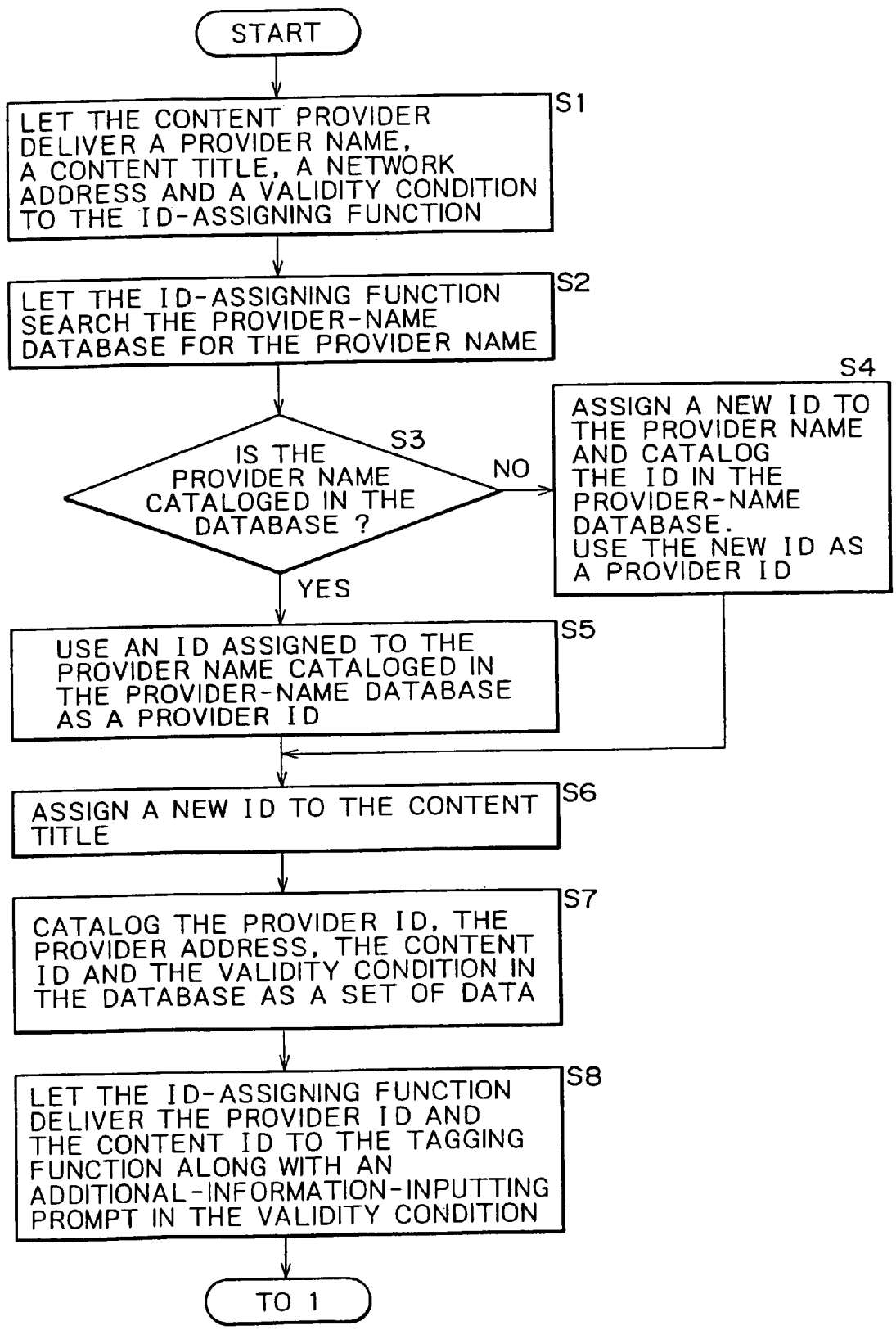
FIG. 4 is a flowchart used for explaining processing carried out by the information processing system shown in FIG. 1.

The flowchart begins with a step S1 shown in FIG. 4 at which the content provider operates the provider apparatus 2 to transmit information from the provider functional unit 41 to the ID-assigning functional unit 42 employed in the ID-assigning server 3 by way of the Internet 1. The information includes the title of a provided content, its own name used as a provider name, the content provider's network address used for making an access to the provider apparatus 2 through the Internet 1 and a validity-condition including additional-information-inputting prompt, details of which will be described later by referring to FIG. 12. At the next step S2, the ID-assigning functional unit 42 searches the database 43 for a provider name matching the provider name received from the provider functional unit 41.

At the next step S3, the ID-assigning functional unit 42 forms a judgment as to whether or not the content provider's name received from the provider functional unit 41 has already been cataloged in the database 43. If the content provider's name received from the provider functional unit 41 has not been cataloged in the database 43, the flow of the operations goes on to a step S4 at which a new provider ID is assigned to the content provider's name and the content provider's name is cataloged in the database 43. The new ID is used as a provider ID. If the outcome of the judgment formed at the step S3 indicates that the content provider's name received from the provider functional unit 41 has already been cataloged in the database 43, on the other hand, the flow of the operations goes on to a step S5 at which the ID-assigning functional unit 42 reads out an ID assigned to the name of the content provider from the database 43 and used the ID as a provider ID.

The flow of the operations then goes on from the step S4 or S5 to a step S6 at which the ID-assigning functional unit 42 assigns a new ID to a title of the content received from the provider functional unit 41 and uses the assigned ID as a content ID. At the next step S7, the ID-assigning functional unit 42 catalogs the provider ID, the content ID assigned at the step S6, the network address of the content provider and the validity-condition received from the provider functional unit 41 at the step S2 in the database 43 as a set of data. The cataloged provider ID is the provider ID assigned at the step S4 or S5 whereas the cataloged network address of the content provider is the content provider's network address newly cataloged at the step S4 or the content provider's network address read out at the step S5 along with the provider ID.

An example of the database 43 employed in the ID-assigning functional unit 42 is shown in FIG. 12. As shown in the figure, the database 43 includes content IDs such as 0001, 0002 and 0003, provider IDs such as Re0003 and Re0004, content provider network addresses such as www dot cdshop dot com and www dot books dot corn and content titles such as "Best Soundtrack", "Symphony No. 5" and "Edison's Biography". For example, the content ID 0001 is associated with the provider ID Re0003, the content provider network address www dot cdshop dot corn and the content title Best Soundtrack.

Further, a medium ID, a channel ID and an output time are added as a broadcasting reference ID.

The database 43 also includes table entry numbers 0001 to 0003 each associated with a content ID. Each table entry number is a validity-condition shown in FIG. 13.

A validity-condition is a condition imposed by a content provider on a content recipient or a content purchaser. As shown in FIG. 13, in a validity-condition indicated by the table entry number 0001, a deadline for accepting a response is set at 23:59 on Oct. 5, 2001. In a validity-condition indicated by the table entry number 0002, a deadline for accepting a response is set at 12:00 on Nov. 30, 2001. In a validity-condition indicated by the table entry number 0003, a deadline for accepting a response is set at 23:59 on Dec. 2, 2001. A deadline for accepting a response is a deadline by which a content recipient must give a response to an inquiry made by the content provider. That is to say, a response received after the deadline is not accepted. To be more specific, a response received after the time and the date specified in the validity-condition is not accepted.

As shown in FIG. 13, in a validity-condition indicated by the table entry number 0002, an age restriction is set at 18 years old. That is to say, a content recipient responding to the validity-condition indicated by the table entry number 0002 must be at least 18 years old. This age restriction is not applicable (N/A) to a validity-condition indicated by the table entry number 0001 and there is no age restriction (None) for validity-condition indicated by the table entry number 0003.

In a validity-condition indicated by the table entry number 0002, the profile-information is classified to be an adult category. In a validity-condition indicated by the table entry number 0003, the profile-information is classified to be a child-oriented category. Thus, a content recipient responding to the validity-condition indicated by the table entry number 0002 must be an adult of at least a predetermined age and a content recipient responding to the validity-condition indicated by the table entry number 0003 must be a child under a predetermined age.

In a validity-condition indicated by the table entry number 0002, a personal-verification function is prescribed to be a registered person. Thus, a responding content recipient must be a registered user.

In a validity-condition indicated by the table entry number 0002, a payment means in the profile-information is prescribed to be use of a credit card such as JCB, VISA or AMEX, which are each a service mark. In a validity-condition indicated by the table entry number 0003, the payment means in the profile-information is prescribed to be use of a bank check. The content recipient is required to pay a content fee by using the prescribed method.

In a validity-condition indicated by the table entry number 0002, an area restriction of a navigation function is prescribed to be all the US territories except Alaska. In a validity-condition indicated by the table entry number 0003, the area restriction of the navigation function is prescribed to be California only. That is to say, a responder is required to be a resident or presently located in the prescribed territory.

In a validity-condition indicated by the table entry number 0001, an additional-information-inputting prompt is prescribed to require an input of a string of 2 characters. In a validity-condition indicated by the table entry number 0003, an additional-information-inputting prompt is prescribed to require an input of a string of up to 3 characters.

In a validity-condition indicated by the table entry number 0001, input 1 in the additional information, that is, a correct answer to a first question of a quiz, is prescribed to be 'ABC cola'. In a validity-condition indicated by the table entry number 0003, input 1 in the additional information prescribes the correct answer, which is a number 1.

In a validity-condition indicated by the table entry number 0001, input 2 in the additional information, that is, a correct answer to a second question of a quiz, is prescribed to be 'an ABC man'. The responder is required to enter these correct answers.

In a validity-condition indicated by the table entry number 0003, the lower limit of a balance of an account is prescribed to be 300 dollars. Thus, a content recipient is required to have a balance of an account of at least 300 dollars.

By prescribing a validity-condition in advance as described above, a content provider is capable of limiting content requesters to those within a predetermined range.

At the next step S8 of the flowchart shown in FIG. 4, the ID-assigning functional unit 42 transmits the provider ID, the content ID, and the additional-information-inputting prompt in the validity-condition to the tagging functional unit 45 through the Internet 1.

At the next step S9, the tagging functional unit 45 adds a broadcasting reference ID to the provider ID, the content ID and the additional-information-inputting prompt. The broadcasting reference ID shows information related to broadcasting of the provider ID, the content ID and the additional-information-inputting prompt. The information includes an order, media, a time and a channel type of the broadcasting. In this embodiment, the tagging functional unit 45 encodes the provider ID, the content ID, the additional-information-inputting prompt and the broadcasting reference ID into tag codes having a format suitable for broadcasting from the broadcasting apparatus 5 to the receiver 10 by way of the satellite 21.

FIG. 14 is a diagram showing a model of a tag coding process carried out by the tagging functional unit 45. As shown in the figure, in the tagging functional unit 45, an encryption unit 91 encrypts an input comprising a content ID of 0001, a provider ID of Re0003 and a broadcasting reference ID of BC0011 on the basis of a convention input from a medium-selecting switch 93. In this embodiment, the convention is a selected one of a hand-phone multi-cast header & tag-data signal convention 101, an Internet multi-cast header & tag-data signal convention 102, a satellite television header & tag-data signal convention 103, a satellite radio header & tag-data signal convention 104, a ground-wave television header & tag-data signal convention 105, a ground-wave radio header & tag-data signal convention 106, a CATV header & tag-data signal convention 107 or a satellite-data broadcasting header & tag-data signal convention 108. In the case of the example shown in FIG. 1, data is transmitted by satellite radio communication. Thus, the encryption is based on the satellite radio header & tag-data signal convention 104.

It should be noted that, in order to form a judgment as to whether or not data is correct in a self evaluation unit 153 to be explained later by referring to FIG. 15, self evaluation based on a checksum is carried out. The tagging functional unit 45 carries out also additional processing based on this checksum.

A digital-data-inserting unit 92 further inserts predetermined data based on a convention selected by the medium-selecting switch 93 into the data encrypted by the encryption unit 91. The digital-data-inserting unit 92 outputs a result of insertion to the broadcasting functional unit 46 employed in the broadcasting apparatus 5.

It should be noted that the encryption unit 91 can also be provided at a stage following the digital-data-inserting unit 92.

Figure 5:
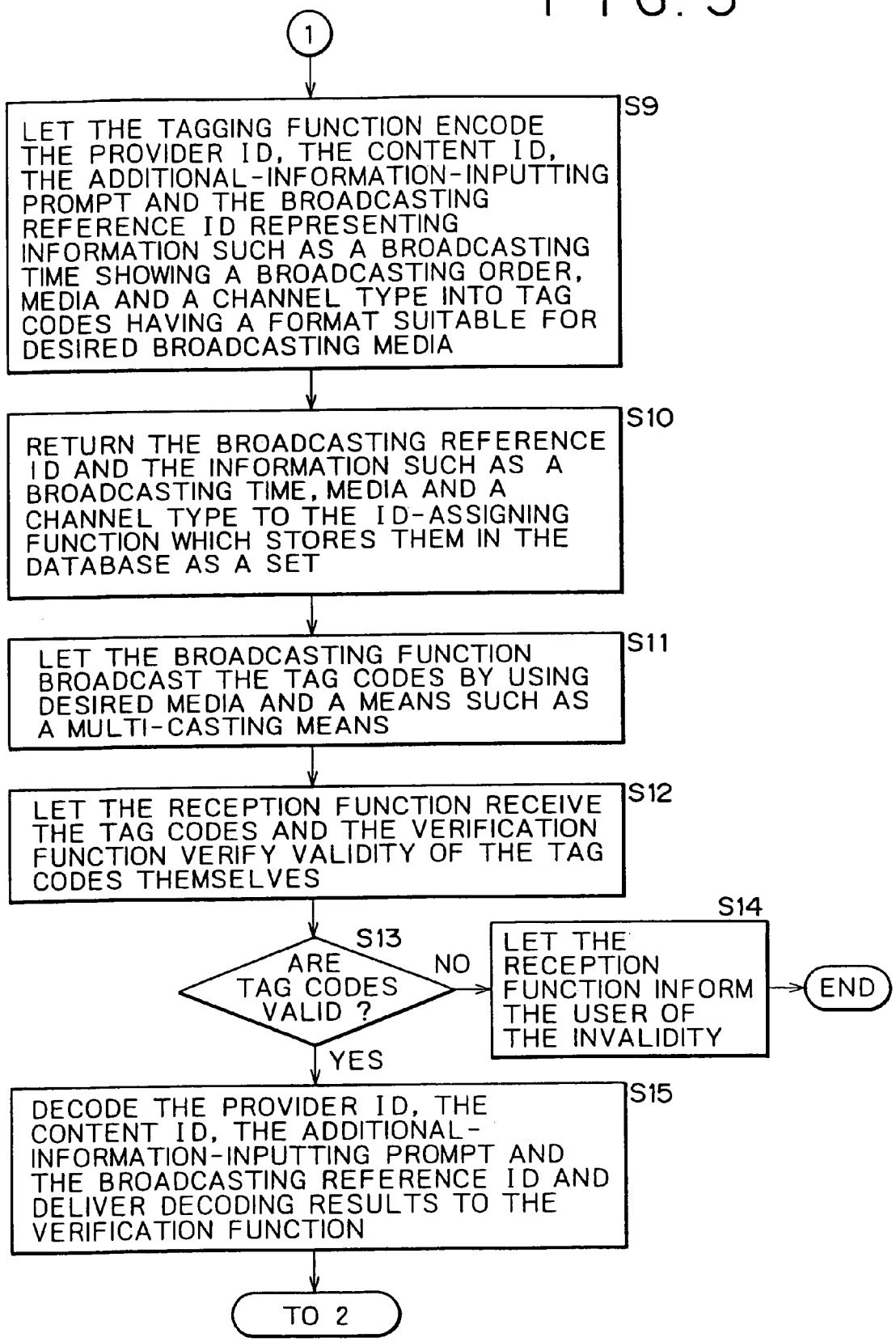
FIG. 5 is a continuation flowchart used for explaining processing carried out by the information processing system shown in FIG. 1.

At a step S10 of the flowchart shown in FIG. 5, the tagging functional unit 45 supplies the broadcasting reference ID allocated at the step S9 along with the corresponding information such as a broadcasting time, communication media and a channel type to the ID-assigning functional unit 42 which stores the broadcasting reference ID and the corresponding information in the database 43.

Typical data cataloged in the database 43 is shown in FIG. 12. As shown in the figure, broadcasting reference IDs BC0011, BC0012 and BC0023 are associated with content IDs 0001, 0002 and 0003 respectively. The broadcasting reference ID BC0011 is prescribed to have satellite radio communication media, a channel number of 112 and an output time of 2:30:45 to 2:30:55. On the other hand, the broadcasting reference ID BC0012 is prescribed to have satellite radio communication media, a channel number of 134 and an output time of 3:35:15 to 3:35:25.

As described above, a broadcasting serial ID is associated with information such as communication media, a channel number and an output time. As an alternative, the communication media, the channel number and the output time themselves are used as a broadcasting serial ID. It should be noted, however, that by prescribing a broadcasting serial ID in terms of a number or a symbol other than the communication media, the channel number and the output time, the table shown in FIG. 12 can be updated with ease.

At the next step S11, the tagging functional unit 45 transfers the tag codes to the broadcasting functional unit 46 employed in the broadcasting apparatus 5 by way of the Internet 1.

At the step S111, the broadcasting functional unit 46 employed in the broadcasting apparatus 5 digitally multiplexes the tag codes received from the tagging functional unit 45 with real audio data of the program by adopting a method such as a watermark technique and then transmits a result of multiplexing to the satellite 21 by way of the antenna 6. The result of multiplexing is eventually broadcasted to receivers 10 by the satellite 21.

At the next step S12, the reception functional unit 53 employed in the receiver 10 receives the broadcasted tag codes from the broadcasting functional unit 46 and transfers the tag codes to the tag-decoding functional unit 54. The tag-decoding functional unit 54 examines a checksum added to the tag codes in order to verify the validity of the tag codes. At the next step S13, the tag-decoding functional unit 54 forms a judgment as to whether the tag codes are valid or invalid. If the tag codes are determined to be invalid, the flow of the operations goes on to a step S14 at which the content recipient is informed of the invalidity. The notice is given to the content recipient typically as a voice message output by the speaker 237 or a visible indicator output by a display control unit 248.

If the outcome of the judgment formed at the step S13 indicates that the tag codes are valid, on the other hand, the flow of the operations goes on to a step S15 at which the tag-decoding functional unit 54 decodes the input tag codes, extracting the provider ID, the content ID, the additional-information-inputting prompt and the broadcasting reference ID. The tag-decoding functional unit 54 then transfers the provider ID, the content ID, the additional-information-inputting prompt and the broadcasting reference ID to the verification functional unit 47 employed in the verification server 7 by way of the Internet 1.

Figure 15:
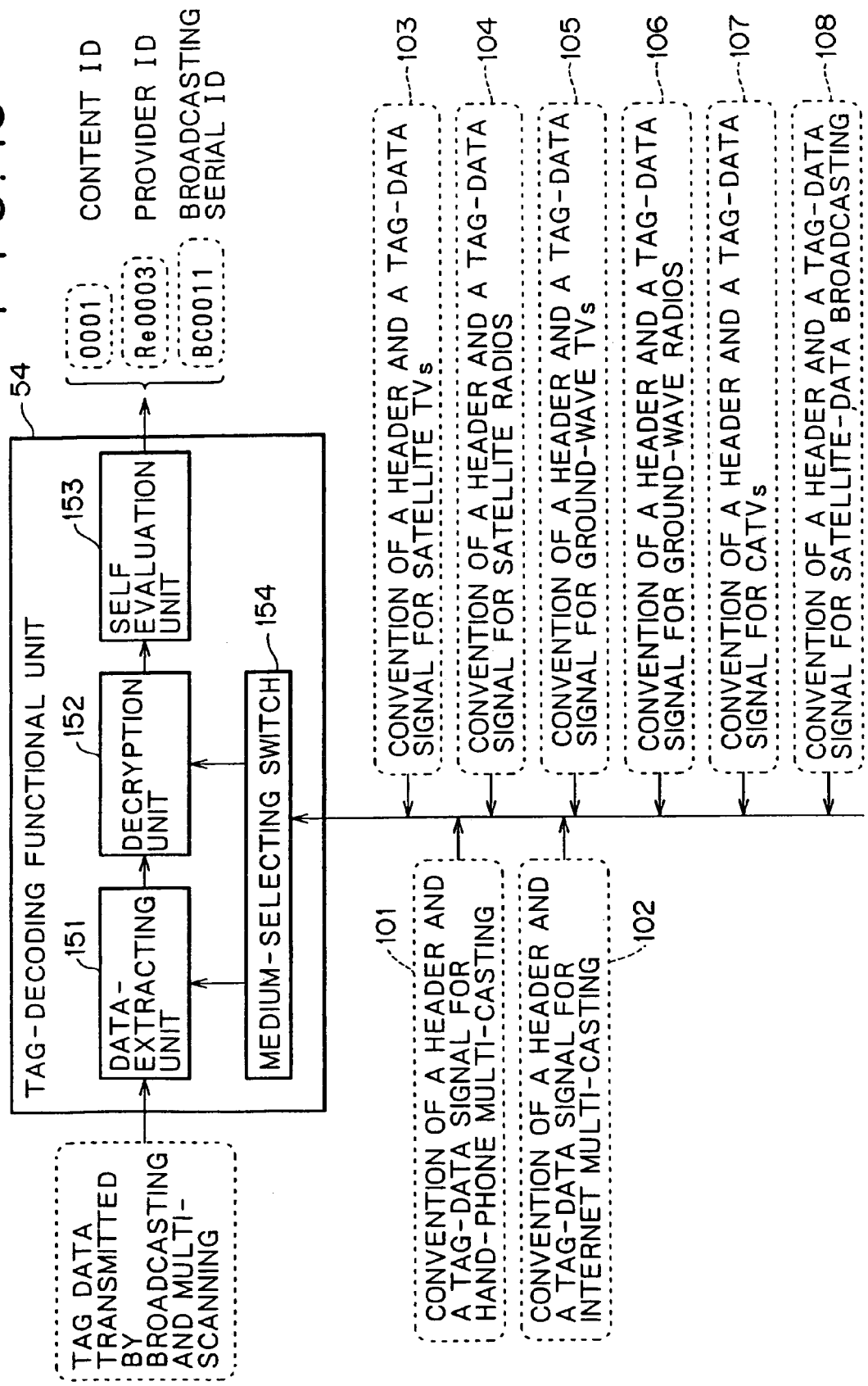
FIG. 15 is an explanatory diagram showing more detailed functions of a tag-decoding functional unit employed in the information processing system shown in FIG. 2.

FIG. 15 is a diagram showing a typical configuration of the tag-decoding functional unit 54 which carries out the processing of the step S15. As shown in the figure, the tag-decoding functional unit 54 includes a data-extracting unit 151 for receiving data input from the reception functional unit 53. The data-extracting unit 151 also receives a convention selected by a medium-selecting switch 154 among the handphone multi-cast header & tag-data signal convention 101 to the satellite-data broadcasting header & tag-data signal convention 108 which have been mentioned earlier by referring to FIG. 14. The data-extracting unit 151 extracts necessary information from the input data on the basis of the received convention and supplies the extracted information to a decryption unit 152.

The decryption unit 152 carries out decryption processing also based on the convention received from the medium-selecting switch 154. The decryption processing is a process opposite to the encryption carried out by the encryption unit 91 shown in FIG. 14. The decryption unit 152 outputs a result of decryption to a self evaluation unit 153 which carries out self evaluation on the decrypted data received from the decryption unit 152 by using a checksum in order to form a judgment as to whether the decrypted data is a correct or incorrect result of decryption. If the decrypted data is a correct result of decryption, the content ID of 0001, the provider ID of Re0003 and the broadcasting reference ID of BC0011, which were input to the encryption unit 91 shown in FIG. 14, are acquired and transferred to the verification functional unit 47.

Figure 6:
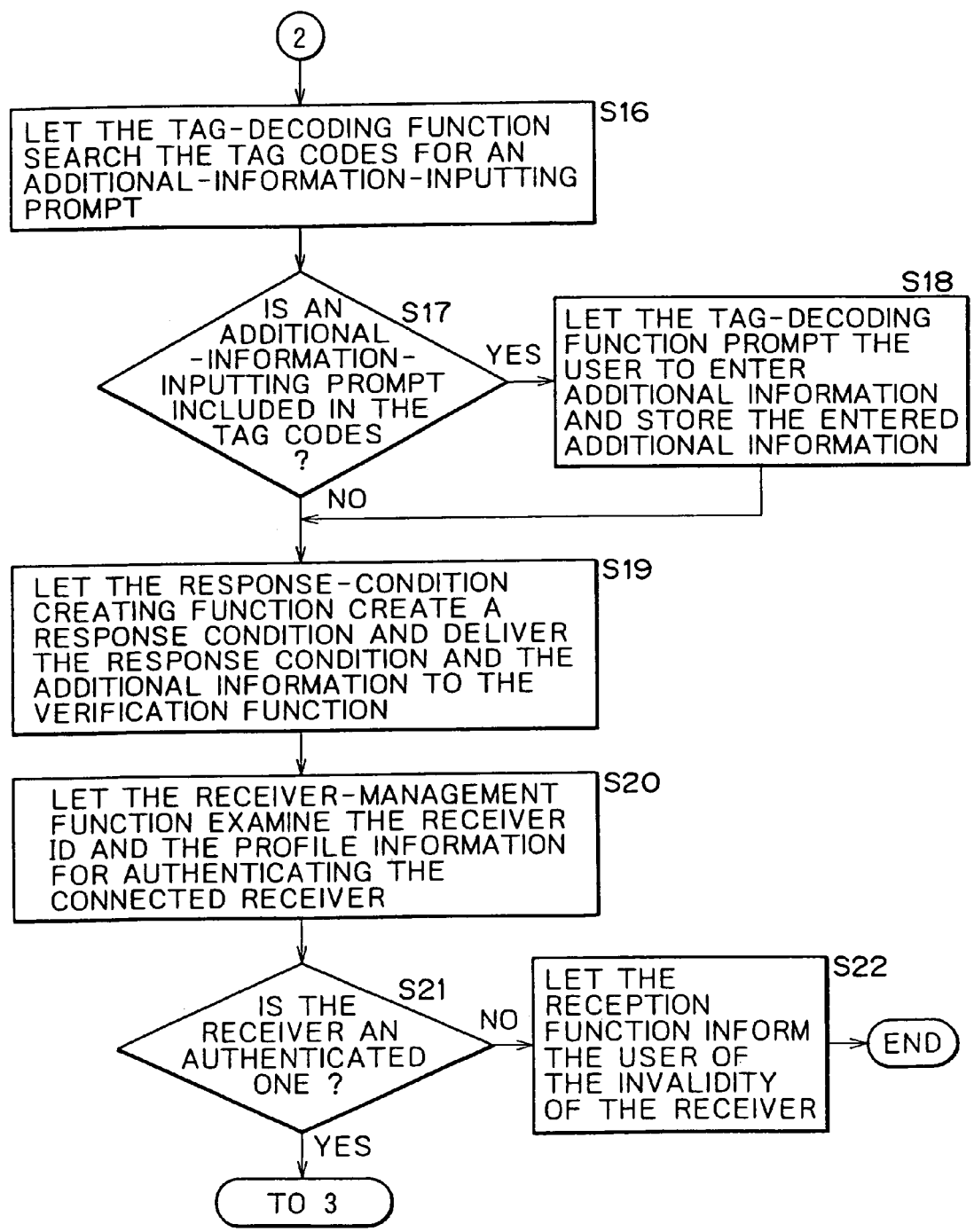
FIG. 6 is a continuation flowchart used for explaining processing carried out by the information processing system shown in FIG. 1.
Figure 7:
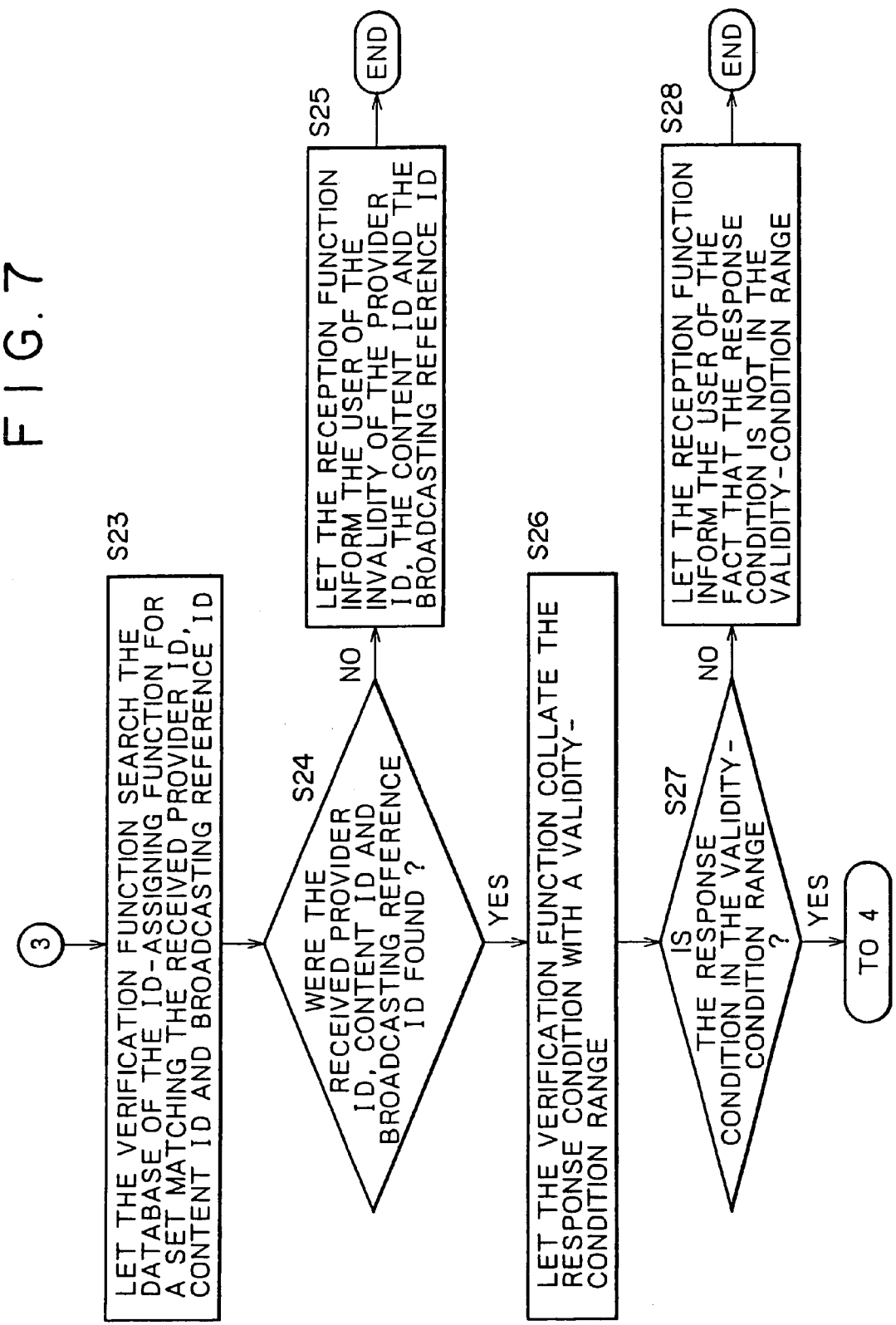
FIG. 7 is a continuation flowchart used for explaining processing carried out by the information processing system shown in FIG. 1.

Then, at a step S16 of the flowchart shown in FIG. 6, the tag-decoding functional unit 54 searches the tag codes for an additional-information-inputting prompt. At the next step S17, the tag-decoding functional unit 54 forms a judgment as to whether or not the tag codes include an additional-information-inputting prompt. If the tag codes include an additional-information-inputting prompt, the flow of the operations goes on to a step S118 at which the user (the content recipient) is prompted to enter additional information. The additional information entered by the user is stored. If the provider functional unit 41 requests the user to enter additional information such as a response to a quiz, a response to a questionnaire, a number of a lottery, a password or the name of a commodity, a message is given to the user, requesting the user to enter such additional information. The additional information entered by the user in response to the message is stored in a memory.

If the outcome of the judgment formed at the step S17 indicates that the tag codes do not include an additional-information-inputting prompt, on the other hand, the processing of the step S18 is skipped.

If the outcome of the judgment formed at the step S17 indicates that the tag codes do not include an additional-information-inputting prompt, or after the processing of the step S18 is completed, the flow of the operations goes on to a step S19 at which the tag-decoding functional unit 54 creates a response condition.

Figure 16:
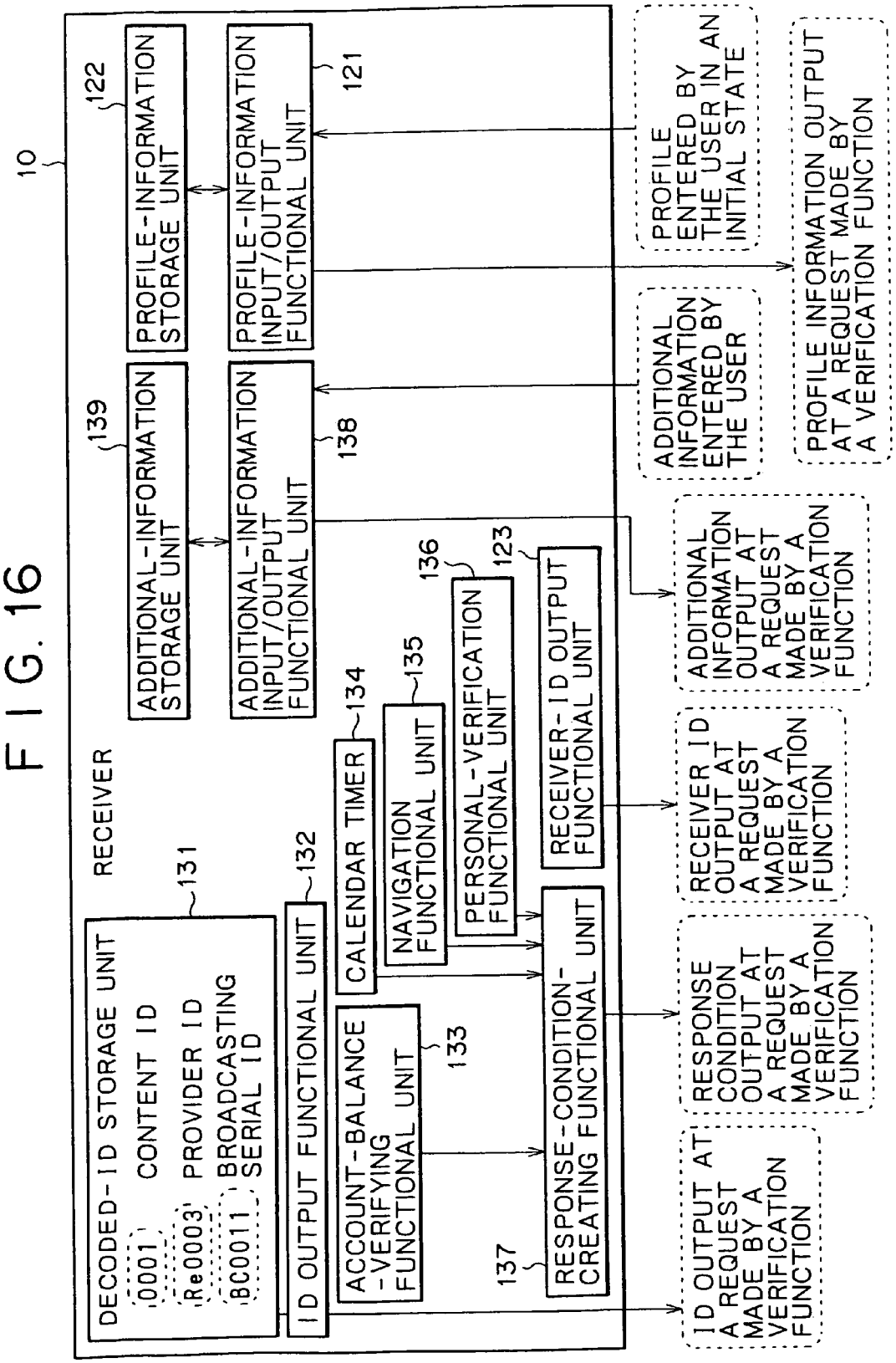
FIG. 16 is an explanatory diagram showing more detailed functions of a receiver employed in the information processing system shown in FIG. 2.

Processing to create a response condition is explained by referring to FIG. 16, which is a diagram showing functions related to the processing carried out by the receiver 10 to create a response condition.

In this embodiment, a static condition of personal information of a content recipient (a user) is treated as profile-information. On the other hand, a dynamic condition is treated as a response condition. A static condition is a condition that basically remains unchanged from input to input while a dynamic condition varies from input to input. A dynamic condition entered by the user from time to time is treated as additional information. Examples of the profile-information are a name, a gender, a postal address, an occupation, a cataloged territory, a payment means, an age and a consent condition. Profile-information is entered by the content recipient in advance through a profile-information input/output functional unit 121 and stored in a profile-information storage unit 122 in a typical format like one shown in FIG. 17. The consent condition is a condition on which presentation of profile-information of the content recipient to the content provider is based. In the example shown in FIG. 17, the consent condition is prescribed as "Except adults" indicating that the content recipient does not allow the profile-information of the content recipient to be presented to a content provider presenting adult contents. A customer number in the example shown in FIG. 17 indicates a customer number assigned to the customer by a predetermined store. This customer number is not a customer number assigned by the privacy-guarding functional unit 50 to the customer as will be described later.

The profile-information stored in the profile-information storage unit 122 is supplied to the receiver-management functional unit 48 by way of the profile-information input/output functional unit 121 to be stored in the database 49 employed therein. FIG. 18 is a diagram showing typical profile-information stored in the database 49. The substances of the profile-information stored in the database 49 are basically the same as those of the profile-information shown in FIG. 17. However, the profile-information shown in FIG. 18 includes a cataloging date, which is a date on which this profile-information is cataloged. In addition, the profile-information shown in FIG. 18 also includes a receiver-ID output by a receiver-ID output functional unit 123 employed in the receiver 10 to indicate that the profile-information is associated with the receiver-ID.

A decoded-ID storage unit 131 is used for storing a content ID, a provider ID and a broadcasting reference ID, which are obtained as a result of decoding carried out by the tag-decoding functional unit 54. If necessary, these IDs are supplied to the verification functional unit 47 by way of an ID output functional unit 132.

The receiver-ID output functional unit 123 supplies a receiver-ID stored in advance in the reception functional unit 53 to the receiver-management functional unit 48 to be stored in the database 49 thereof. In the example show in FIG. 18, a receiver-ID of Ssny1003 is stored in the database 49, being associated with other pieces of profile-information.

The receiver 10 comprises an account-balance-verifying functional unit 133, a calendar timer 134, a navigation functional unit 135 and a personal-verification functional unit 136. The account-balance-verifying functional unit 133 checks a balance of an account owned by the content recipient. The calendar timer 134 generates the present time and the present date. The navigation functional unit 135 acquires the present position of the receiver 10. The personal-verification functional unit 136 recognizes the fingerprint, the eyes or the like of the operator of the receiver 10 in order to identify the operator. A response-condition-creating functional unit 137 creates a response condition from results of processing output by the account-balance-verifying functional unit 133, the calendar timer 134, the navigation functional unit 135 and the personal-verification functional unit 136.

FIG. 19 is a diagram showing a typical response condition created by the response-condition-creating functional unit 137. A response date and time included in the response condition are a date and a time at which a response is input. The creation of the response date and time is based on the present time and date of 10:13 and Oct. 3, 2001 generated by the calendar timer 134. The personal-verification functional unit 136 inputs images of the fingerprint and the eyes of the operator of the receiver 10, forming a judgment as to whether or not the images match those of a fingerprint and eyes stored in advance. If they match each other, a phrase of "A cataloged person" is included in the response condition.

An area detected by a navigation function is created on the basis of a present position detected by the navigation functional unit 135. In the example shown in FIG. 19, the present position is the state of California. A present balance of an account is created on the basis of a result of verification produced by the account-balance-verifying functional unit 133. In the example shown in FIG. 19, the account-balance-verifying functional unit 133 verifies the account balance of electronic money held in a memory employed in the receiver 10 to find out that the balance is 342 dollars.

When the user enters additional information, an additional-information input/output functional unit 138 takes in the information and stores it in an additional-information storage unit 139. This processing is carried out at the step S18 described earlier.

At the next step S19, the response-condition-creating functional unit 137 transfers the response condition thus created to the verification functional unit 47, or the additional-information storage unit 139 transfers additional information stored therein to the verification functional unit 47.

At the next step S20, the receiver-management functional unit 48 examines the database 49 to determine whether or not the receiver 10 connected to the verification server 7 is cataloged in the database 49. As described above, the receiver 10 has transmitted a response condition and additional information to the verification functional unit 47. To put it in detail, the verification functional unit 47 issues an inquiry about the receiver-ID to the reception functional unit 53, and takes in the receiver-ID output by the receiver-ID output functional unit 123 in response to the inquiry. The verification functional unit 47 also issues a request for a transfer of profile-information to the profile-information storage unit 122 employed in the reception functional unit 53 through the profile-information input/output functional unit 121. The receiver-management functional unit 48 compares the receiver-ID and the profile-information, which are taken in by the verification functional unit 47, with a receiver-ID and profile-information, which are stored in the database 49 in advance.

FIG. 20 is a diagram showing typical receiver-IDs stored in the database 49. In this cataloging example, cataloging dates of Jun. 5, 2000, Jun. 6, 2000 and Jun. 6, 2000, user names of Taro Tanaka, Jiro Yamada and Hanako Saito as well as model numbers of the receiver 10 of TS-S55, TS-S55 and TS-S55 are associated with receiver-IDs of Ssny1001, Ssny1003 and Ssny1004 respectively.

Then, at the next step S21, the receiver-management functional unit 48 forms a judgment as to whether or not the received receiver-ID and the received profile-information are correct, that is, match respectively a receiver-ID and profile-information, which are stored in the database 49 in advance. If the received receiver-ID and the received profile-information are not correct ones, the flow of the operations goes on to a step S22 at which the user is informed of the invalidity through the reception functional unit 53.

If the outcome of the judgment formed at the step S21 indicates that the received receiver-ID and the received profile-information are correct ones, on the other hand, the flow of the operation goes on to a step S23 at which the verification functional unit 47 forms a judgment as to whether or not the provider ID, the content ID and the broadcasting serial ID, which were received at the step S15 from the reception functional unit 53, match respectively the provider ID, the content ID and the broadcasting serial ID, which were stored by the ID-assigning functional unit 42 in the processing carried out at the step S7. The broadcasting of the provider ID, the content ID and the broadcasting serial ID, which were stored by the ID-assigning functional unit 42, was requested by the provider functional unit 41. To put it in detail, the verification functional unit 47 issues an inquiry about a provider ID and a content ID associated with the broadcasting serial ID to the ID-assigning functional unit 42 through the Internet 1. Then, the provider ID, the content ID and the broadcasting serial ID, which are obtained as a response to the inquiry, are compared respectively with the provider ID, the content ID and the broadcasting serial ID, which were received from the reception functional unit 53.

At the next step S24, the verification functional unit 47 forms a judgment as to whether or not these IDs are IDs stored in the database 43 of the ID-assigning functional unit 42 in advance, that is, whether the received IDs are correct ones. If the received receiver-ID and the received profile-information are not correct ones, the flow of the operations goes on to a step S25 at which the user is informed of the invalidity through the reception functional unit 53.

If the outcome of the judgment formed at the step S24 indicates that the received IDs are correct ones, on the other hand, the flow of the operation goes on to a step S26 at which the verification functional unit 47 examines whether or not the response condition received from the response-condition-creating functional unit 137 at the step S19 falls within the range of the validity-condition cataloged in advance in the database 43 of the ID-assigning functional unit 42 at the step S7. To put it in detail, the verification functional unit 47 issues a request for a transfer of a validity-condition associated with the broadcasting serial ID to the ID-assigning functional unit 42 and then compares the validity-condition transferred by the ID-assigning functional unit 42 with the response condition.

Assume for example that a validity-condition with an entry number of 0003 shown in FIG. 13 has been cataloged in the database 43 for the content ID of 0003 or the broadcasting serial ID of BC0023. Now, also assume for example that the response condition shown in FIG. 19 is acquired. As shown in FIG. 19, the present account balance is 342 dollars, satisfying a validity-condition of 'At least 300 dollars' where the 300 dollars are the required minimum of the account balance.

In addition, a phrase of "The state of California" is prescribed as an area detected by a navigation function in the response condition shown in FIG. 19. Since the area restriction of the validity-condition shown in FIG. 13 is prescribed to be "California only", the area restriction of the validity-condition is also satisfied. As the restriction on the response date and time, a time and a date of 23:59 and Dec. 2, 2001 are prescribed in the validity-condition shown in FIG. 13, while a time and a date of 10:13 and Oct. 3, 2001 are prescribed in the response condition shown in FIG. 19 as a response time and a response date. Thus, this restriction on the response date and time itself is not satisfied. That is to say, the response is given after the response deadline. Since the validity-condition for the personal-verification function shown in FIG. 13 is prescribed to be 'not applicable' (NA), the person verified to be cataloged as shown in FIG. 19 is determined to satisfy this restriction on the user itself without regard to whether or not the user is cataloged.

On the basis of results of the examination described above, at the next step S27, the verification functional unit 47 forms a judgment as to whether or not the response condition falls within the range of the validity-condition. If the response condition does not fall within the range of the validity-condition, the flow of the operations goes on to a step S28 at which the user is informed of this dissatisfaction through the reception functional unit 53. Since the response condition shown in FIG. 19 does not satisfy the restriction on the response date and time of the validity-condition with an entry number of 0003 shown in FIG. 13, the outcome of the judgment formed at the step S27 indicates the dissatisfaction.

On the contrary, the response condition shown in FIG. 19 satisfies the validity-condition with an entry number of 0001 shown in FIG. 13. In this case, the flow of the operations goes on to a step S29 at which the verification functional unit 47 examines the additional information. At the next step S30, the verification functional unit 47 forms a judgment as to whether or not the additional information falls within the range of the validity-condition. In the case of the validity-condition with an entry number of 0001 shown in FIG. 13, for example, the correct answers of the additional information, that is, the correct responses to a quiz, are 'ABC cola' and 'ABC man'. If the user has entered answers other than the correct ones, the outcome of the judgment formed at the step S30 indicates that the additional information does not fall within the range of the validity-condition. In this case, the flow of the operations goes on to a step S31 at which the user is informed of this dissatisfaction by the verification functional unit 47 through the reception functional unit 53.

If the user has entered the correct answers, namely, the 2 phrases 'ABC cola', and 'ABC man' in responses to questions in the quiz, on the other hand, the outcome of the judgment formed at the step S30 indicates that the additional information does fall within the range of the validity-condition. In this case, the flow of the operations goes on to a step S32 at which the verification functional unit 47 examines the profile-information.

For example, assume that the profile-information of the user prescribes a phrase of 'Under 18 years old.' Since the validity-condition with an entry number of 0002 shown in FIG. 13 prescribes a phase of 'At least 18 years old,' the profile-information is determined to not fall within the range of the validity-condition. Even with the profile-information of the user prescribing a phrase of 'Over 18 years,' if the profile-information of the user prescribes a phrase of 'Except adults', the profile-information will be determined to not fall within the range of the validity-condition.

If the profile-information of the user prescribes a phrase of 'Over 18 years,' and does not prescribe a phrase of 'Except adults' as a restriction on the contents, which indicates that an adult content is prohibited, the profile-information will be determined to satisfy the range of the validity-condition.

Figure 8:
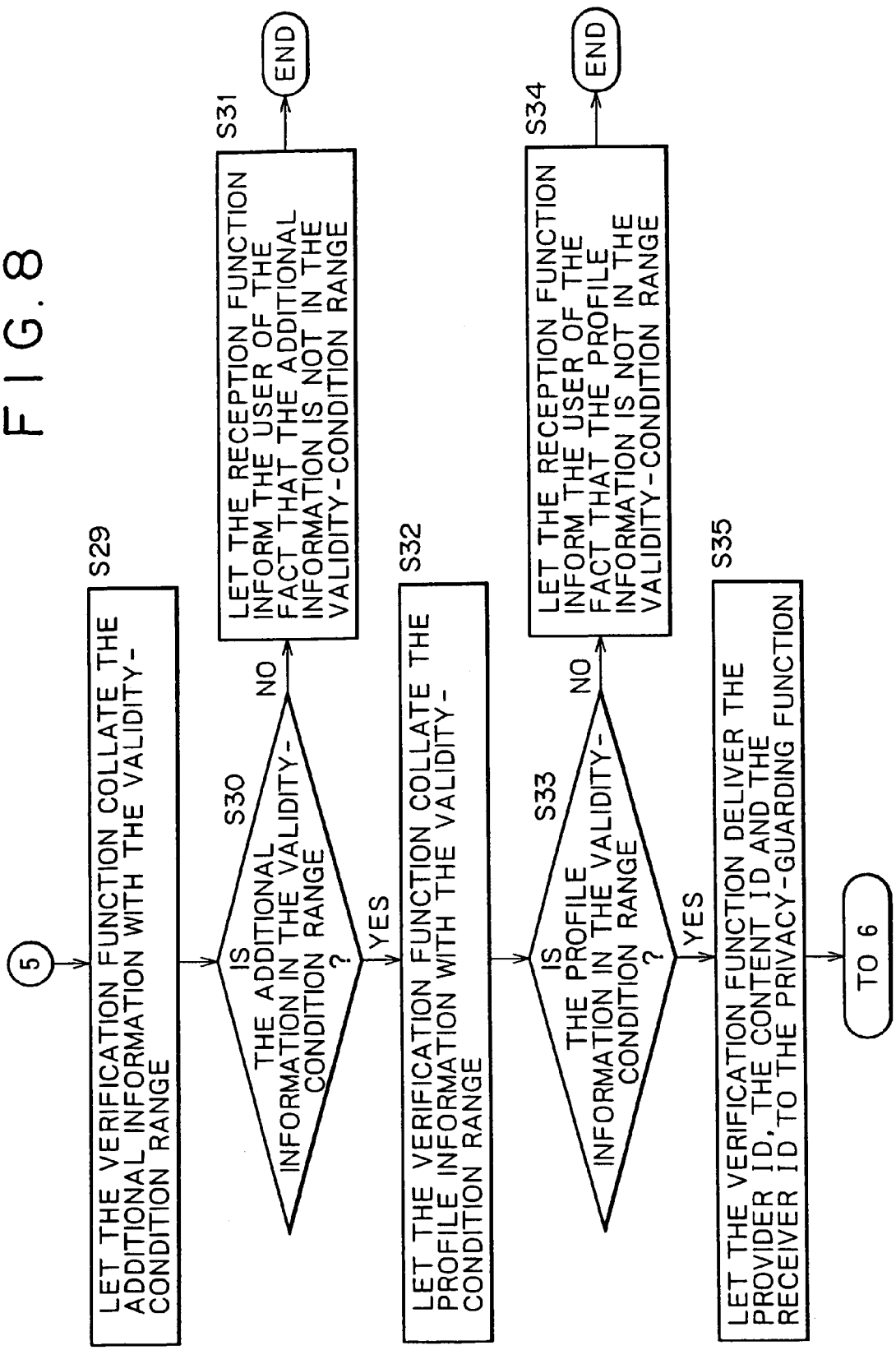
FIG. 8 is a continuation flowchart used for explaining processing carried out by the information processing system shown in FIG. 1.
Figure 9:
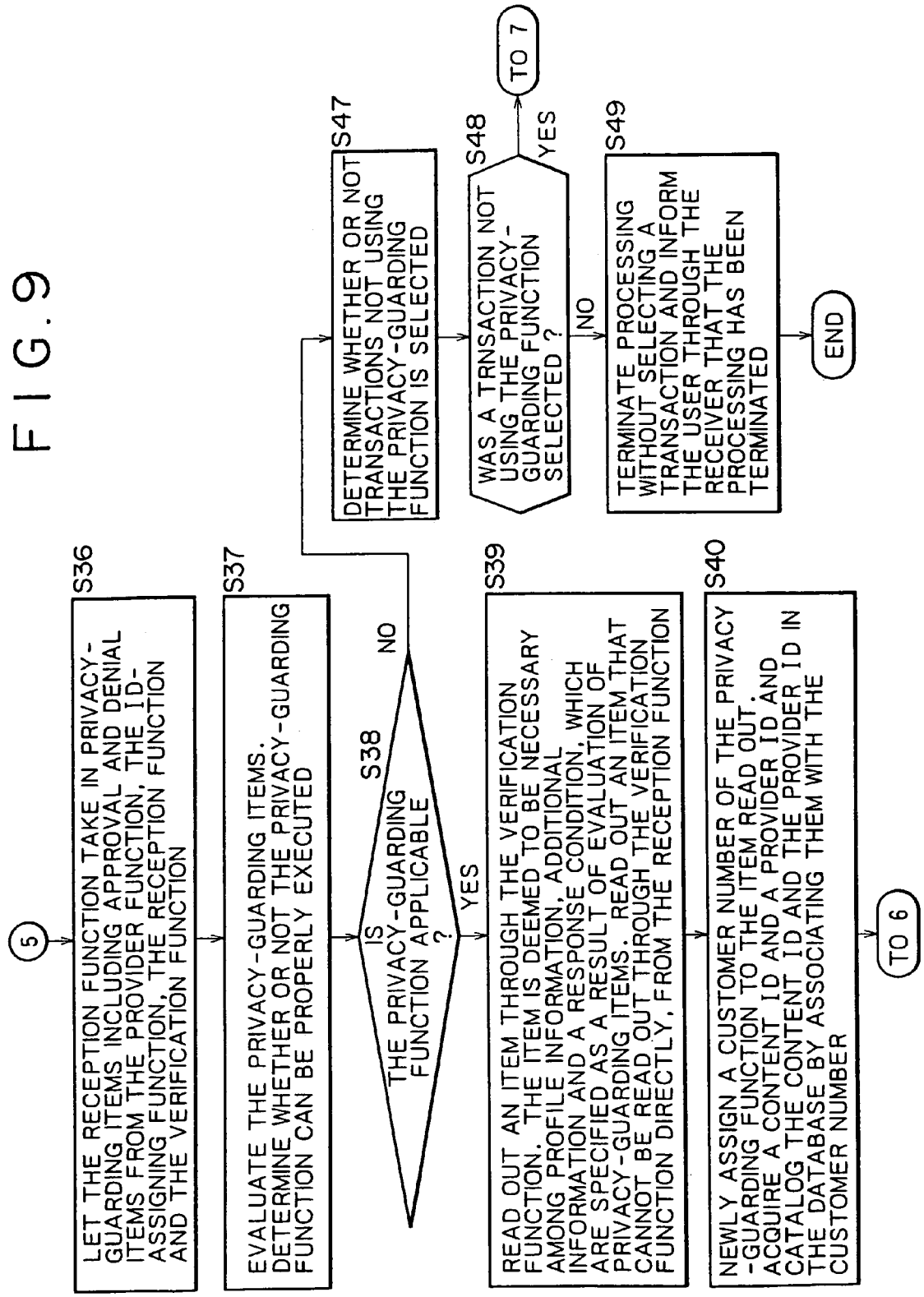
FIG. 9 is a continuation flowchart used for explaining processing carried out by the information processing system shown in FIG. 1.
Figure 10:
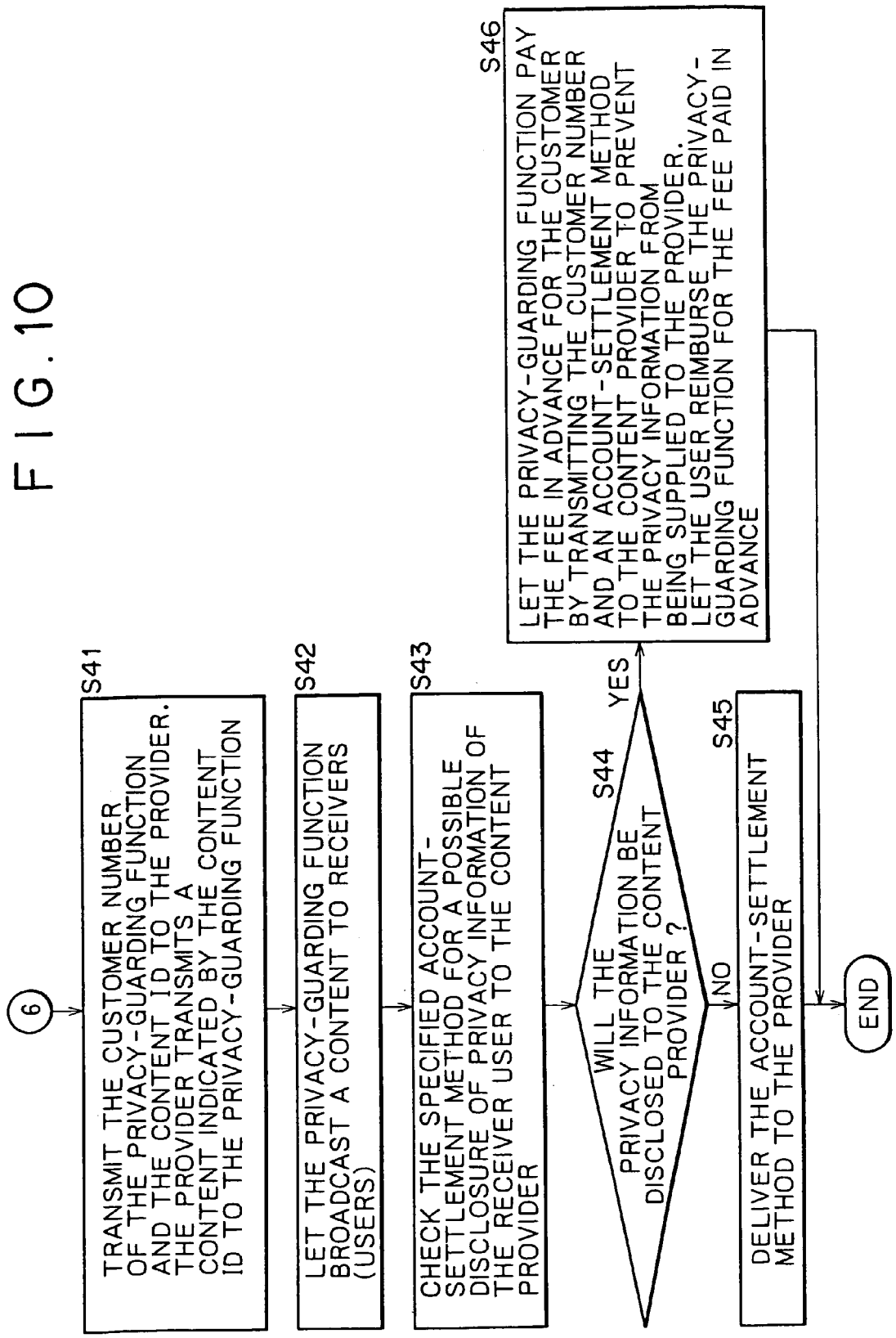
FIG. 10 is a continuation flowchart used for explaining processing carried out by the information processing system shown in FIG. 1.
Figure 11:
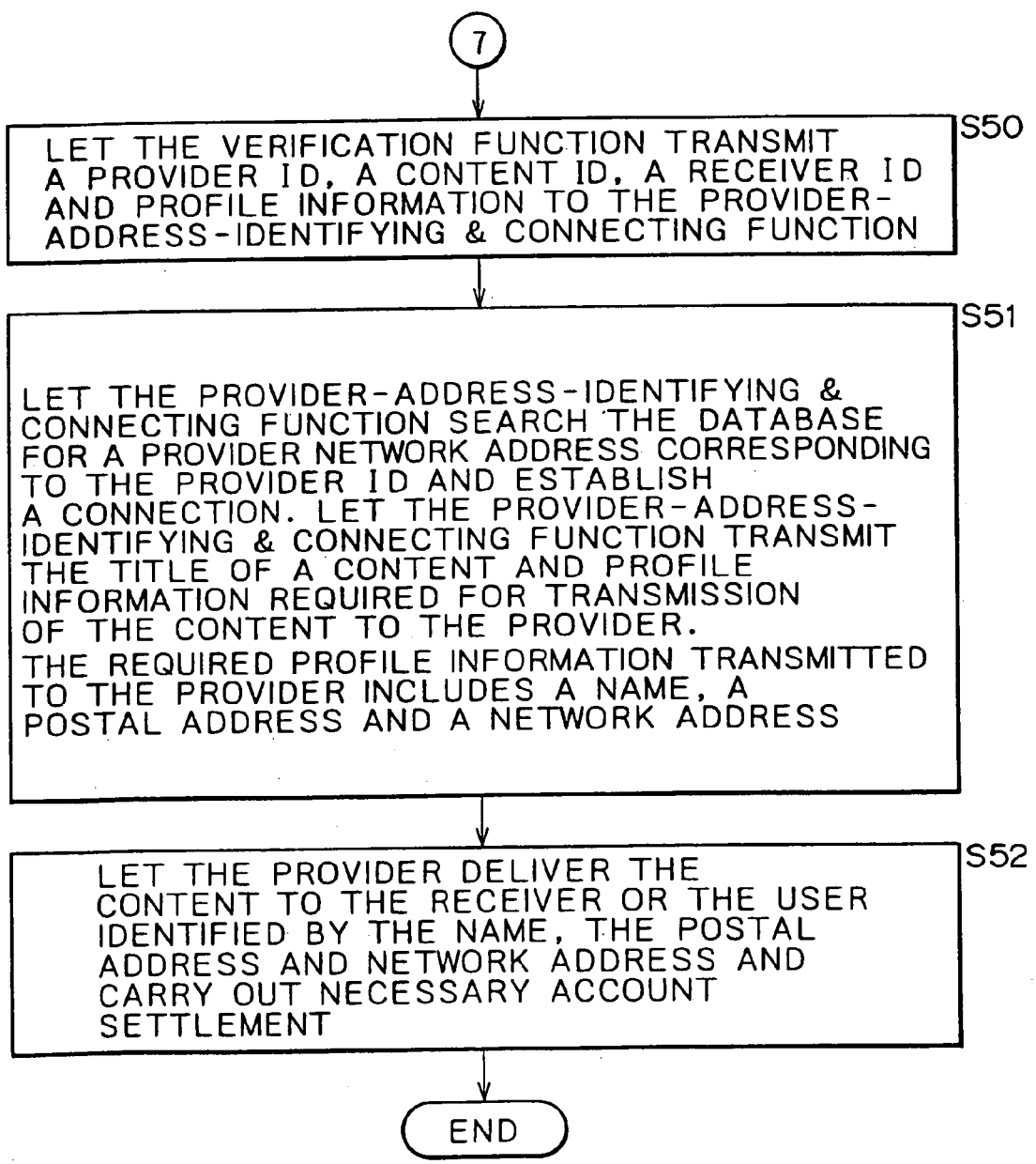
FIG. 11 is a continuation flowchart used for explaining processing carried out by the information processing system shown in FIG. 1.

At the next step S33 of the flowchart shown in FIG. 8, the verification functional unit 47 forms a judgment as to whether or not the profile-information of the user falls within the range of the validity-condition. If the profile-information is determined to not fall within the range of the validity-condition, the flow of the operations goes on to a step S34 at which the user is informed of the dissatisfaction through the reception functional unit 53. If the outcome of the judgment formed at the step S33 indicates that the profile-information falls within the range of the validity-condition, on the other hand, the flow of the operations goes on to a step S35 at which the verification functional unit 47 transmits the provider ID, the content ID and the receiver-ID, which were received from the reception functional unit 53, to the privacy-guarding functional unit 50 by way of the Internet 1.

At the next step S36, the privacy-guarding functional unit 50 takes in privacy-guarding items from the provider functional unit 41, the ID-assigning functional unit 42, the reception functional unit 53 and the verification functional unit 47.

Figure 21:
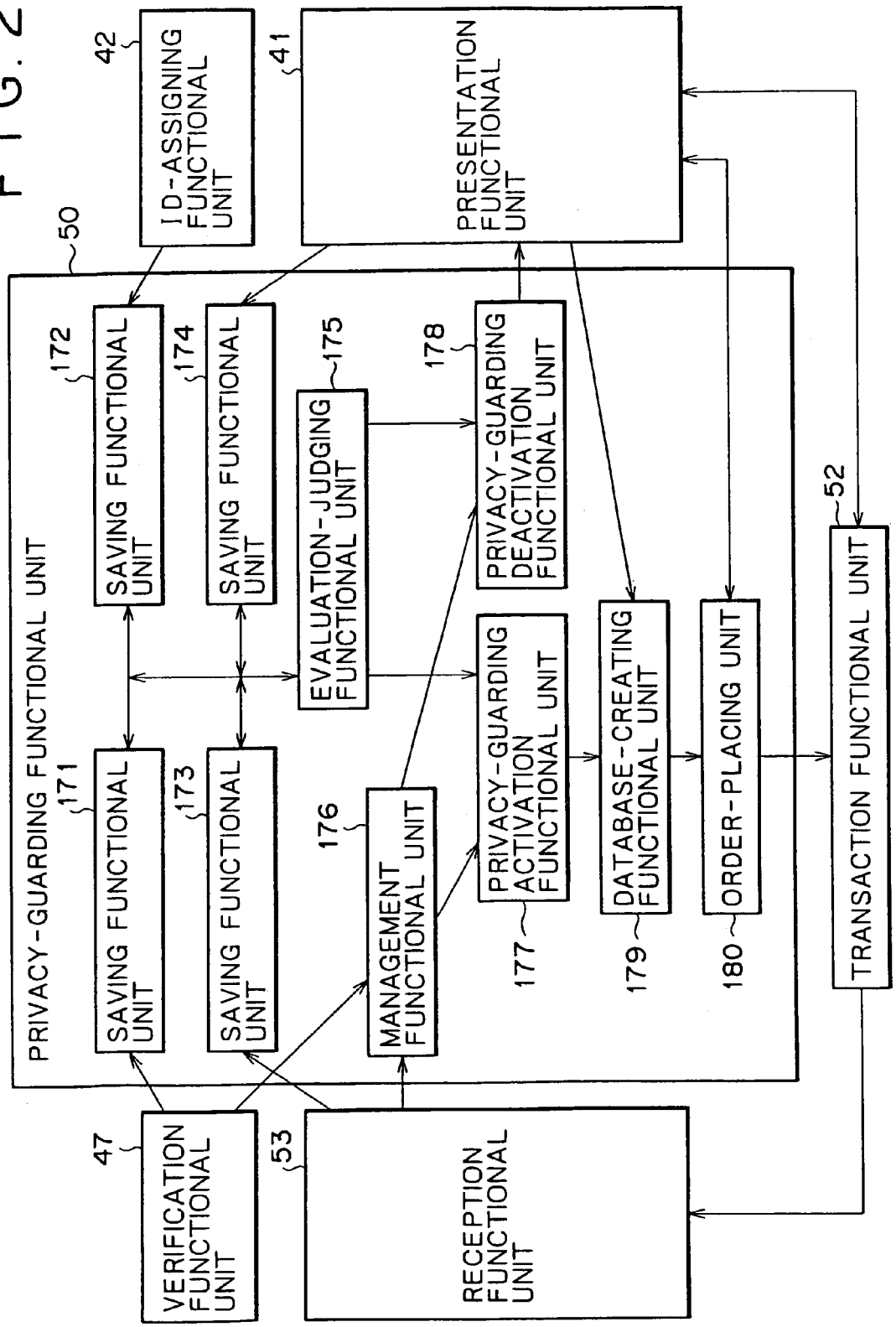
FIG. 21 is an explanatory diagram showing more detailed functions of a privacy-guarding functional unit employed in the information processing system shown in FIG. 2.

For this reason, as shown in FIG. 21, the privacy-guarding functional unit 50 is provided with saving functional units 171 to 174, an evaluation-judging functional unit 175, a management functional unit 176, a privacy-guarding activation functional unit 177, a privacy-guarding deactivation functional unit 178, a database-creating functional unit 179 and an order-placing-unit 180.

The saving functional units 171, 172, 173 and 174 take in privacy-guarding items from the verification functional unit 47, the ID-assigning functional unit 42, the reception functional unit 53 and the provider functional unit 41 respectively.

To put it in detail, trusted by the receiver 10 representing the user and the provider apparatus 2 representing the content provider, the privacy-guarding functional unit 50 presents a content supplied by the provider to the user and settles the account without giving the user's name, postal address and network address to the provider. Thus, while the user of the receiver 10 and the content provider owning the provider apparatus 2 are of course capable of setting privacy-guarding items, in accordance with the present invention, the administrators of the ID-assigning server 3 and the verification server 7 are also capable of setting such items.

The privacy-guarding items are classified into fixed static items and dynamic items varying in dependence on conditions.

The user of the receiver 10 is capable of declaring that 'items such as a postal address, a name, an annual income, and a network address included in the user's own profile-information shall not be provided to any content provider whatsoever without the user's consent' as a static privacy-guarding item. The fee for a presented content is paid through the privacy-guarding functional unit 50 by using a means prescribed in an item for a normal payment means in the profile-information.

In addition, the receiver 10 is capable of setting an item varying in dependence on for example the rating of a content provider as a dynamic privacy-guarding item. The rating of a content provider is the category of the provider. For example, the rating of a content provider is determined by the number of contents produced by the provider, determined by the amount of security money deposited with the verification server 7, or determined by the age range of users provided with contents, that is, determined by the category of the users such as high school students, university students or mature people.

With the rating of a content provider set at a predetermined value of typically 3, the receiver 10 is capable of prescribing the following 2 privacy-guarding items without regard to whether or not setting of a privacy-guarding items prescribed by the content provider exists.

1: Declaration of any of the profile-information, the additional information and the response condition as a privacy-guarding item that the receiver 10 is capable of presenting.

2: Declaration of any of a postal address, a name and a network address in the profile-information as a privacy-guarding item of the receiver 10 that needs to be protected by the privacy-guarding functional unit 50 in reception of a presented content from a content provider or declaration as to whether only broadcasting of contents is to be treated as an operation entrusted to the privacy-guarding functional unit 50 or settlement of accounts is to be included in the operation entrusted to the privacy-guarding functional unit 50.

With the rating of a content provider set at a value other than a predetermined value of typically 3, the receiver 10 is capable of declaring that a request made by the content provider for a privacy-guarding item is accepted as it is.

As an alternative, the receiver 10 declares that a privacy-guarding item be set so that an order be placed with a content provider this time through a privacy-guarding function. In this way, the privacy-guarding function can be utilized on a case-by-case basis.

Examples of the static privacy-guarding items set by the provider apparatus 2 are the following two.

1: Declaration of any of the profile-information, the additional information and the response condition, which are generated by the receiver 10, as an item absolutely desired by the content provider.

2: Declaration of any of a postal address, a name and a network address in the profile-information as a privacy-guarding item of the receiver 10 that needs to be protected by the privacy-guarding functional unit 50 in presentation of a presented content to the user by a content provider or declaration as to whether broadcasting of contents or settlement of accounts is to be treated as an operation entrusted to the privacy-guarding functional unit 50.

Typical dynamic privacy-guarding items of the provider apparatus 2 are described as follows:

1: Declaration of any of the profile-information, the additional information and the response condition, which are generated by the receiver 10, as an item absolutely desired by the content provider. If a portion showing the name of a country for the postal address included in the profile-information, which is an item absolutely desired by the content provider, is a territorial range specified in advance by the provider, that is, if the country is Japan, for example, the following privacy-guarding item (2) is applicable. Otherwise, the following privacy-guarding item (3) is applicable.

2: Declaration of any of a postal address, a name and a network address in the profile-information as a privacy-guarding item of the receiver 10 that needs to be protected by the privacy-guarding functional unit 50 in presentation of a presented content to the user by a content provider or declaration as to whether broadcasting of contents or settlement of accounts is to be treated as an operation entrusted to the privacy-guarding functional unit 50.

3: The content provider does not allow the use of the privacy-guarding functional unit 50 without regard to setting of a privacy-guarding item of the receiver 10. The provider apparatus 2 declares that no transaction is closed if a name, a postal address included in the profile-information of the receiver 10 is requested but the receiver 10 does not present the required item.

The content provider is capable of making an appeal to users that privacy is protected by for example stating that privacy-guarding information is set so as to deliver a diet product Z to a customer through a privacy-guarding function operated by another company so that personal information of a customer placing an order for a diet product with this company is not received by this company.

As a static privacy-guarding item of the ID-assigning functional unit 42, for example, it is possible to declare that, without regard to setting of a privacy-guarding item by the content provider, during a period from 13:00 PM to 20:00 PM on each Thursday, a privacy-guarding item set by the receiver 10 takes precedence of other items.

As a dynamic privacy-guarding item, for a rating of a content provider set at a predetermined value of typically 3, the following privacy-guarding item 1-1 or 1-2 can be declared without regard to whether or not setting of a privacy-guarding item prescribed by the content provider exists. For a rating of a content provider set at a value other than the predetermined one, on the other hand, as a dynamic privacy-guarding item of the receiver 10, the following privacy-guarding item 2 can be declared.

1-1: Declaration of any of the profile-information, the additional information and the response condition, which are generated by the receiver 10, as an item absolutely desired by the content provider.

1-2: Declaration of any of a postal address, a name and a network address in the profile-information as a privacy-guarding item of the receiver 10 to be protected by the privacy-guarding functional unit 50 in presentation of a presented content by a content provider or declaration as to whether broadcasting of contents or settlement of accounts is to be treated as an operation entrusted to the privacy-guarding functional unit 50.

2: The content provider does not allow the use of the privacy-guarding functional unit 50 without regard to setting of a privacy-guarding item of the receiver 10. The provider apparatus 2 declares that no transaction is closed if a name and a postal address included in the profile-information of the receiver 10 is requested but the receiver 10 does not present the required item.

The ID-assigning functional unit 42 is capable of recruiting a number of member stores by for example making an appeal to the stores that a privacy-guarding item is set so that, in response to an order placed with a group U of content providers participating in this service and particularly handling adult commodities, the ordered content is delivered to the customer by using a privacy-guarding function in a uniform way so as to protect the confidentiality of the order.

If the verification functional unit 47 is capable of verifying a person specified in a response condition of the receiver 10, as a dynamic privacy-guarding item of the receiver 10, the following privacy-guarding item 1-1 or 1-2 can be declared without regard to the existence or non-existence of setting of privacy-guarding items prescribed by the provider. If the verification functional unit 47 is not capable of verifying a person specified in a response condition of the receiver 10, on the other hand, as a dynamic privacy-guarding item of the receiver 10, the following privacy-guarding item 2 can be declared.

1-1: Declaration of any of the profile-information, the additional information and the response condition, which are generated by the receiver 10, as an item that can be presented by the receiver 10.

1-2: Declaration of any of a postal address, a name and a network address in the profile-information as a privacy-guarding item of the receiver 10 desired by the user to be protected by the privacy-guarding functional unit 50 in reception of a presented content from a content provider or declaration as to whether broadcasting of contents or settlement of accounts is to be treated as an operation entrusted to the privacy-guarding functional unit 50.

2: The receiver 10 is capable of declaring that a request made by the content provider for a privacy-guarding item is accepted as it is without regard to setting of an ordinary privacy-guarding item.

The verification functional unit 47 is capable of prompting a number of users to utilize the service by for example making an appeal to the users that a privacy-guarding item is set so that, if the age information included in profile-information indicated by a cataloged receiver-ID is a phrase of "Under 18 years old", a content is delivered to the customer by using a privacy-guarding function in a uniform manner so as to protect the confidentiality of the order.

As described above, privacy-guarding items set by the verification functional unit 47, the ID-assigning functional unit 42, the reception functional unit 53 and the provider functional unit 41 are stored by the saving functional units 171 to 174. Thus, at a step S37 of the flowchart shown in FIG. 9, the evaluation-judging functional unit 175 employed in the privacy-guarding functional unit 50 evaluates the privacy-guarding items, determining whether or not the privacy-guarding functions can be properly executed. That is to say, if a declared privacy-guarding item is contradictory, its privacy-guarding function cannot be applied. For example, as described above, if the provider functional unit 41 makes a request for presentation of profile-information by the reception functional unit 53 but cannot receive the presentation, the fact that a content cannot be presented is declared and, in addition, if there is a limitation that the reception functional unit 53 is not capable of presenting profile-information requested by a content provider, a privacy-guarding function cannot be applied. If the receiver 10 consents to presentation of profile-information requested by the content provider, on the other hand, a privacy-guarding function can be applied.

Thus, at the next step S38, the evaluation-judging functional unit 175 employed in the privacy-guarding functional unit 50 forms a judgment as to whether a privacy-guarding function can or cannot be applied. If a privacy-guarding function can be applied, the flow of the operations goes on to a step S39. At the step S39, the management functional unit 176 reads out an item from the verification functional unit 47. The item is deemed to be necessary among profile-information, additional information ad a response condition, which are specified as a result of evaluation of privacy-guarding items. An item that cannot be read out from the verification functional unit 47 is read out from the reception functional unit 53.

At the next step S40, the privacy-guarding activation functional unit 177 employed in the privacy-guarding functional unit 50 supplies the item read out by the management functional unit 176 to the database-creating functional unit 179. The database-creating functional unit 179 assigns a temporarily set customer number to this item. The database-creating functional unit 179 further acquires a content ID and a provider ID, which are associated with a broadcasting reference ID of interest, and catalogs the content ID and the provider ID in a database 51 by associating them with the customer number.

FIG. 22 is a diagram showing typical cataloging of data in the database 51. In this example, the cataloged data is a name, a postal address, a network address, a method of account-settlement and a customer number.

At the next step S41, the order-placing-unit 180 employed in the privacy-guarding functional unit 50 transmits the customer number and the content ID to the provider functional unit 41 by way of the Internet 1 to request the provider functional unit 41 that a content indicated by the content ID be broadcasted to the order-placing-unit 180 of the privacy-guarding functional unit 50. The provider functional unit 41 transmits the content to the order-placing-unit 180 as requested and the order-placing-unit 180 receives the content. At the next step S42, the content is directly passed on to the reception functional unit 53. If the content is information that can be transmitted through the Internet 1, the content is transmitted to the reception functional unit 53 through the Internet 1.

The content may be held not by the provider functional unit 41 but by the transaction functional unit 52 employed in the commerce server 9. In this case, the provider functional unit 41 requests the order-placing-unit 180 to issue a request for the content to the transaction functional unit 52. In accordance with this request, the order-placing-unit 180 supplies information required for transmission of the content to the transaction functional unit 52 to request the transaction functional unit 52 that a content be transmitted to the reception functional unit 53. The information includes the user's postal address, name and network address. As requested, the transaction functional unit 52 transmits the content to the reception functional unit 53. That is to say, the order-placing-unit 180 transmits the content indirectly to the reception functional unit 53 in this case.

Then, at the next step S43, the order-placing-unit 180 searches privacy-guarding information, broadcasting of which is prohibited by the user, for an account-settlement method specified by the user. This is because it is quite within the bounds of possibility that the account-settlement method supposed to be protected by the privacy-guarding information is supplied to the content provider. At the next step S44, the order-placing-unit 180 forms a judgment as to whether or not it is quite within the bounds of possibility that the account-settlement method supposed to be protected by the privacy-guarding information is supplied to the content provider. If it is quite within the bounds of possibility that the account-settlement method supposed to be protected by the privacy-guarding information is supplied to the content provider, the flow of the operations goes on to a step S46 at which the order-placing-unit 180 pays the fee in advance for the customer by transmitting the customer number and an account-settlement method to the provider functional unit 41 as a set in order to prevent the privacy-guarding information from being supplied to the content provider. The account-settlement method transmitted to the provider functional unit 41 is a method applied by the order-placing-unit 180 to the provider functional unit 41 and not the account-settlement method specified by the user. Thus, even if the account-settlement method adopted by the order-placing-unit 180 is transmitted to the provider functional unit 41, the privacy information of the user does not leak out.

The order-placing-unit 180 also settles an accurate account of the reception functional unit 53 for the advance payment made to the provider functional unit 41. The user of the reception functional unit 53 then makes a payment to the order-placing-unit 180.

If the outcome of the judgment formed at the step S44 indicates that informing the content provider of the account-settlement method specified by the user does not necessarily mean disclosure of privacy information to the provider, on the other hand, the flow of the operations goes on to a step S45 at which the order-placing-unit 180 transfers the account-settlement method specified by the user to the provider functional unit 41. In this case, the provider functional unit 41 issues a request for a payment of the fee to the user of the reception functional unit 53 on the basis of the account-settlement method of the user received from the order-placing-unit 180.

If the outcome of the judgment formed at the step S38 indicates that a privacy-guarding function cannot be applied, on the other hand, the flow of the operations goes on to a step S47 at which the evaluation-judging functional unit 175 examines use of a privacy-guarding function in a transaction. At the next step S48, the evaluation-judging functional unit 175 forms a judgment as to whether or not a transaction not using a privacy-guarding function has been selected. Assume for example that it is known that the user does not want any transaction not using a privacy-guarding function, that is, the user always wants only a transaction using a privacy-guarding function, and it is known that, as a result of evaluation of a privacy-guarding item at the step S37, the outcome of the judgment formed at the step S38 indicates disagreement with a privacy-guarding item presented by the provider. In this case, the transaction can not be settled.

In this case, the flow of the operations goes on from the step S48 to a step S49 at which the evaluation-judging functional unit 175 terminates processing without selecting a transaction and informs the user through the receiver that the processing has been terminated.

If the outcome formed at the step S48 indicates that a transaction not using a privacy-guarding function has been selected, on the other hand, the flow of the operations goes on to a step S50 at which the privacy-guarding deactivation functional unit 178 employed in the privacy-guarding functional unit 50 notifies the verification functional unit 47 that a privacy-guarding function is not used. At the step S50, the verification functional unit 47 informed of the fact that a privacy-guarding function is not used transmits a provider ID, a content ID, a receiver-ID and profile-information to the provider-address-identifying & connecting functional unit 44 employed in the ID-assigning server 3 by way of the Internet 1. At the next step S51, the provider-address-identifying & connecting functional unit 44 searches the database 43 employed in the ID-assigning functional unit 42 for a provider network address corresponding to the provider ID received at the step S50, and uses the network address of the provider to establish a connection to the provider functional unit 41 through the Internet 1. Then, the provider-address-identifying & connecting functional unit 44 transmits the title of a content and profile-information required for transmission of the content to the provider functional unit 41, requesting the provider functional unit 41 to present the content. The required profile-information transmitted to the provider functional unit 41 includes a name, a postal address and a network address.

At the next step S52, the provider functional unit 41 delivers the specified content to a user specified by the provider-address-identifying & connecting functional unit 44. Then, the provider functional unit 41 carries out necessary processing to settle an account with the user of the receiver 10.

Figure 23:
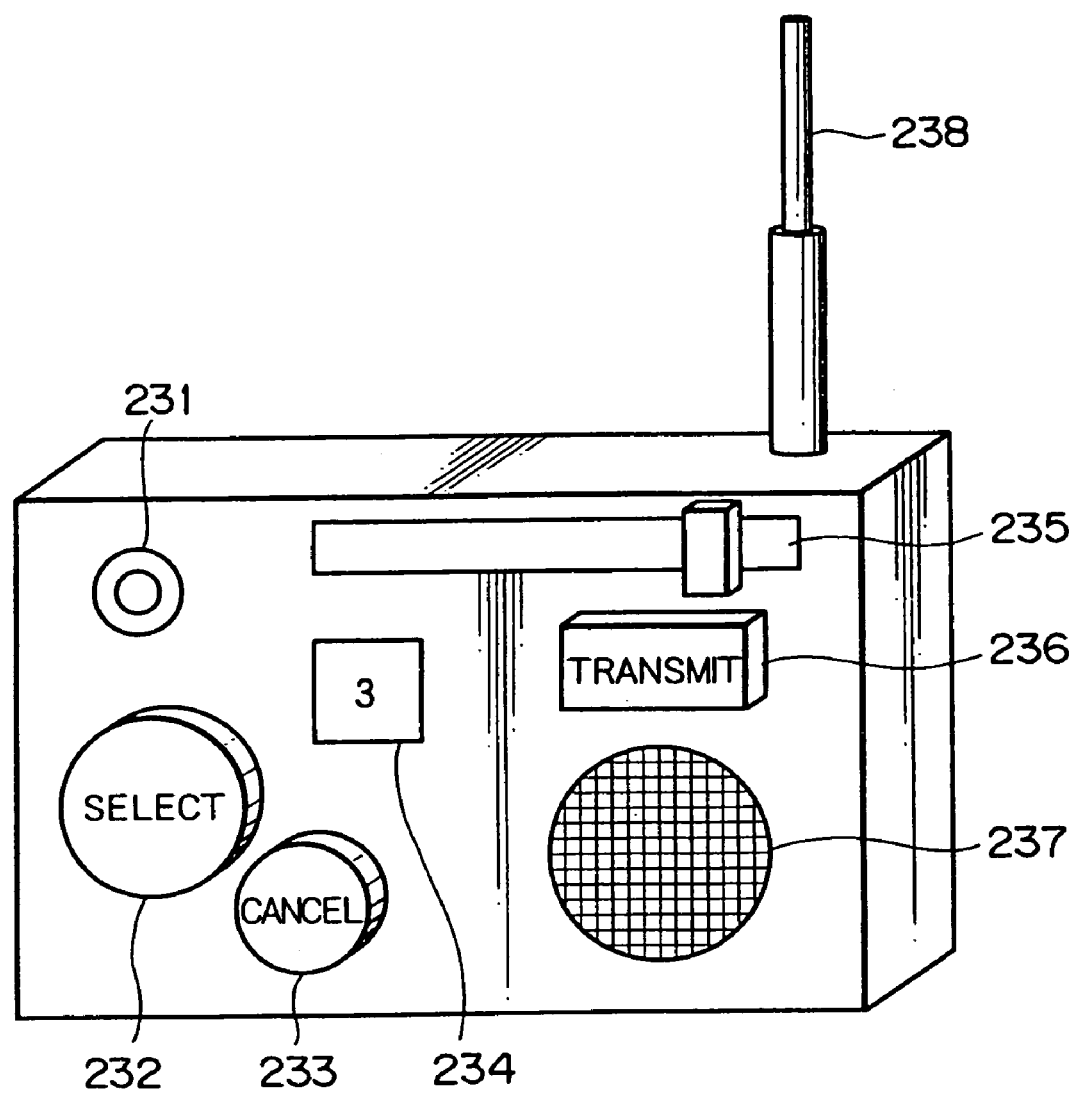
FIG. 23 is a diagram showing an external view of a typical configuration of the receiver employed in the information processing system shown in FIG. 1.
Figure 24:
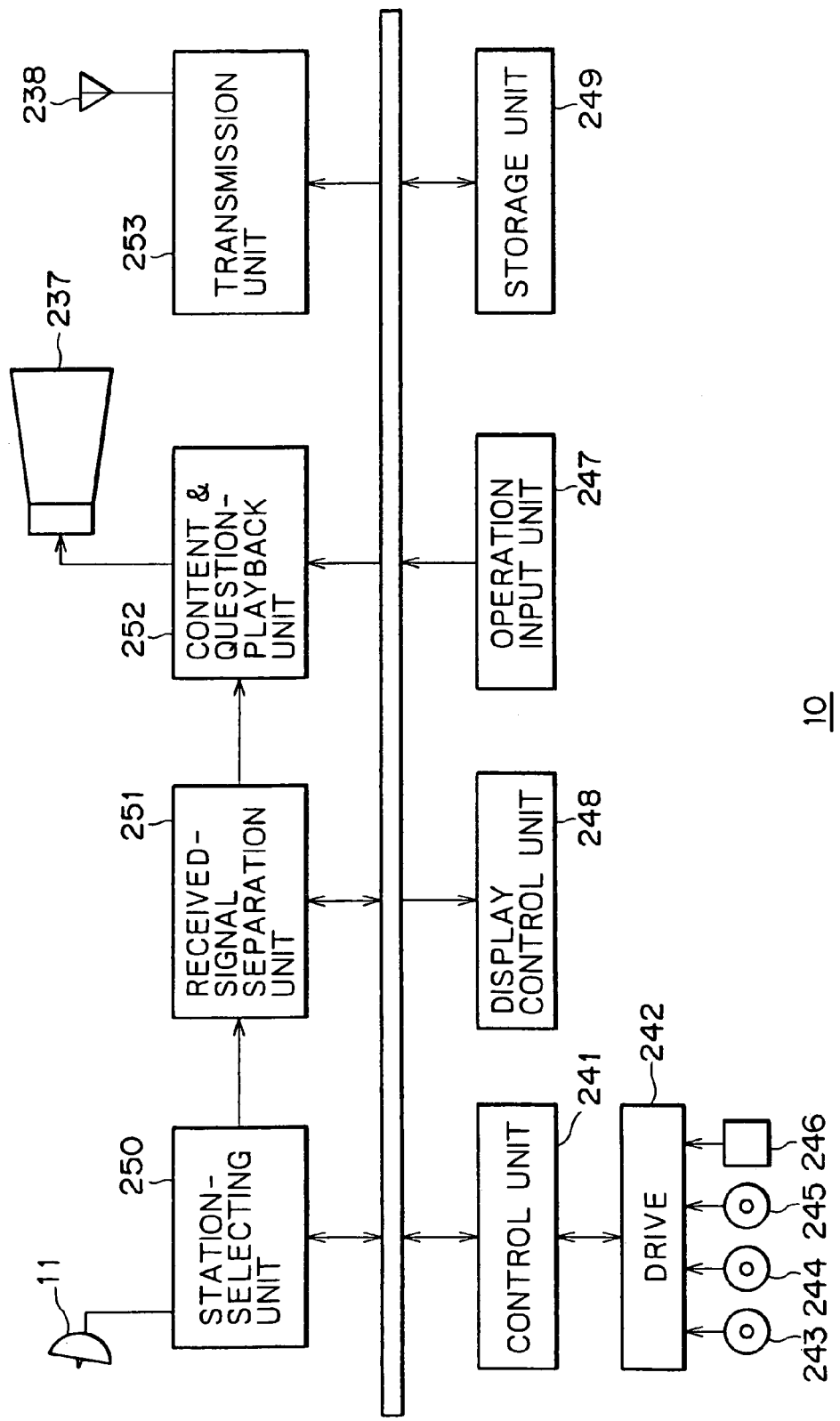
FIG. 24 is a diagram showing a typical electrical configuration of the receiver shown in FIG. 23.

Next, a concrete typical configuration of the receiver 10 is explained by referring to FIGS. 23 and 24.

FIG. 23 is a diagram showing an external view of a typical configuration of the receiver 10. An active indicator 231 is turned on when a select button 232 and a cancel button 233 are put in an operatable state by an activate signal received from the broadcasting apparatus 5. On the other hand, the active indicator 231 is turned off when the select button 232 and the cancel button 233 are put in an unoperatable state by a deactivate signal received from the broadcasting apparatus 5.

The select button 232 is used by the user (the content recipient) to enter a response to a broadcasted question. To be more specific, a number entered as a response is incremented by 1 each time the select button 232 is pressed. The number of times the select button 232 was pressed so far is displayed on a select count display window 234. The value of a response entered by pressing the select button 232, that is, a value displayed on the select count display window 234, is decremented by 1 each time the cancel button 233 is pressed.

In order to enter the number 3 as a response to a question, for example, the user needs to press the select button 232 three times. If the user presses the select button 232 four times by mistake, for example, the user needs to press the cancel button 233 once. At that time, the select count display window 234 once displays the number 4 and eventually displays a final answer of 3 (=4-1).

It should be noted that a response to a question displayed on the select count display window 234 is stored in a storage unit 249 shown in FIG. 24, being associated with the question ID of the question.

If a content data sale service is rendered through radio broadcasting, for example, the select button 232 is also pressed to make a request for downloading or recording of content data. The content data sale service is a service to sell compressed and encoded data of music broadcasted as an audio signal by multiplexing the data in a broadcasted signal. The compressed and encoded data is obtained as a result of encryption. In this case, if the cancel button 233 is pressed, the request for downloading or recording of content data is canceled.

A content ID identifying content data downloaded by an operation to press the select button 232 is stored in the storage unit 249 shown in FIG. 24 much like a response to a question and other data. The content ID is embedded in the broadcasted signal.

A tuning slide 235 is operated to select a radio broadcasting station, a broadcast of which is to be received.

A transmit button 236 is pressed to set the receiver 10 in a response data transmission-mode. To put it concretely, the transmit button 236 is pressed to transmit a question ID stored in the storage unit 249 and data such as a response associated with the question ID to the verification server 7. The transmit button 236 is also pressed to indicate a desire to purchase a decryption key of downloaded encrypted data. That is to say, the transmit button 236 is pressed to make a request for a transfer of the decryption key.

A speaker 237 outputs voices and sounds of a radio program. An antenna 238 transmits a radio signal conveying a question ID stored in the storage unit 249 and data such as a response associated with the question ID.

FIG. 24 is a diagram showing a typical electrical configuration of the receiver 10. A control unit 241 employed in the receiver 10 controls a drive 242 to read out a control program from a magnetic disk 243, an optical disk 244, a magnetic optical disk 245 or a semiconductor memory 246. The control unit 241 also controls other components composing the receiver 10 on the basis of operation information entered by the user via an operation input unit 247 by execution of the control program read out by the drive 242.

When an activate signal is received by a received-signal separation unit 251, for example, the control unit 241 controls a display control unit 248 to turn on the active indicator 231 and controls an operation input unit 247 to detect an operation to press the select button 232 or the cancel button 233. When a deactivate signal is received by the received-signal separation unit 251, on the other hand, the control unit 241 controls the display control unit 248 to turn off the active indicator 231 and controls the operation input unit 247 to ignore an operation to press the select button 232 or the cancel button 233.

The operation input unit 247 detects an operation carried out by the user on the select button 232, the cancel button 233, the tuning slide 235 or the transmit button 236 and outputs information on the operation to the control unit 241. Controlled by the control unit 241, the display control unit 248 controls operations to turn on or off the active indicator 231 and to display information on the select count display window 234.

The storage unit 249 is used for storing a response, a question ID, and the address of a response-collecting apparatus supplied thereto by operating the select button 232 and the cancel button 233 as a set. The storage unit 249 is also used for storing a unique receiver-ID assigned to the receiver 10. It should be noted that the receiver-ID is not only used for identifying the receiver 10, but also used by an administrator for identifying the user through management executed by associating the receiver-ID with the profile of the user. In addition, the storage unit 249 is also used for storing downloaded content data, that is, compressed and encoded data of music and the like. It should be noted that the storage unit 249 can be integrated with the magnetic disk 243, the optical disk 244, the magnetic optical disk 245 or the semiconductor memory 246 into a single unit.

Controlled by the control unit 241, a station-selecting-unit 250 receives a signal broadcasted by a radio broadcasting station selected by the user by operating the tuning slide 235 and supplies the signal to a received signal separation unit 251. Also controlled by the control unit 241, the received-signal separation unit 251 separates an audio signal from the broadcasted signal and outputs the audio signal to a content & question-playback unit 252. The received-signal separation unit 251 also separates signals other than the audio signal and a content from the broadcasted signal and supplies the other signals to the control unit 241. The other signals include a question ID, the network address of a verification server 7 to receive a response from the user, an activate or deactivate signal and a decryption key. In addition, the received-signal separation unit 251 separates the content from the broadcasted signal and supplies the content to the storage unit 249.

The content & question-playback unit 252 plays back an audio signal received from the received-signal separation unit 251 and outputs a signal obtained as a result of the playback operation to the speaker 237. In addition, the content & question-playback unit 252 also decodes encrypted content data read out from the storage unit 249 by using a decryption key received from the control unit 241, plays back a result of decoding and outputs a signal obtained as a result of the playback operation to the speaker 237. The encrypted content data read out from the storage unit 249 is compressed and encoded data of music or the like.

A communication unit 253 has a function equivalent to the data communication function of a hand phone or a PHS (Personal Handyphone System). Controlled by the control unit 241, the communication unit 253 reads out a data set comprising a response, a question ID and the network address of a response-collecting apparatus from the storage unit 249, adds the receiver-ID to the response and the question ID, and transmits the response, the question ID and the receiver-ID to the network address of the response-collecting apparatus as a radio signal. In addition, also on the basis of control executed by the control unit 241, the communication unit 253 transmits information for applying for a purchase of a decryption key for decoding encrypted content data stored in the storage unit 249 to the broadcasting apparatus 5 as a radio signal. In actuality, the information comprises a content ID and a receiver-ID.

Figure 25:
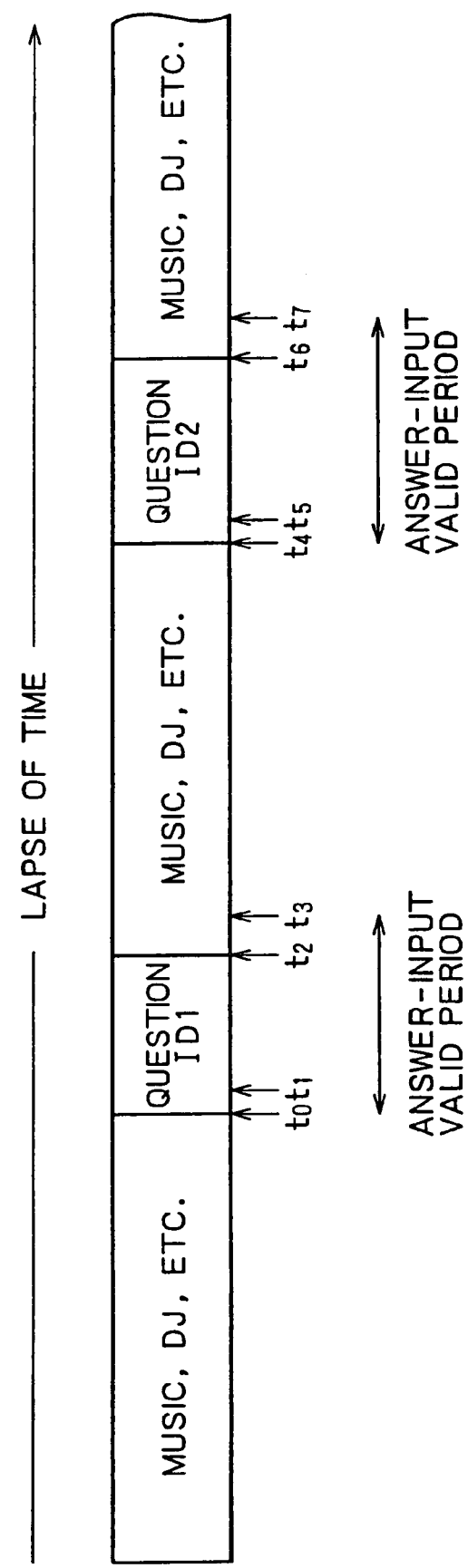
FIG. 25 is an explanatory diagram showing timings of questions included in a program broadcasted by a broadcasting apparatus employed in the information processing system shown in FIG. 1.

As shown in FIG. 25, the broadcasting apparatus 5 outputs an audio signal of question 1 or question 2 in a quiz or a questionnaire to respectively a period between times t0 and t2 or a period between times t4 and t6 during a program such as a disk jockey and music. At that time, a question ID1 or a question ID2 for identifying question 1 and question 2 respectively are embedded in the broadcasted signal along with the network address of the verification server 7 for collecting answers to the question. In addition, an activate signal is embedded into a period between times t1 and t3 slightly lagging behind the period between the times t0 and t2 or a period between times t5 and t7 slightly lagging behind the period between the times t4 and t6 in the broadcasted signal. A deactivate signal is embedded into other periods of the broadcasted signal.

Thus, in the example shown in FIG. 25, the receiver 10 is allowed to accept an answer to question 1 identified by the question ID1 from the user only during the period between the times t1 and t3 and to accept an answer to question 2 identified by the question ID2 only during the period between the times t5 and t7.

Next, reception processing carried out by the receiver 10 is explained by referring to a flowchart shown in FIG. 26. The reception processing is started when the power supply of the receiver 10 is turned on.

The flowchart shown in FIG. 26 begins with a step S81 at which the station-selecting-unit 250 employed in the receiver 10 receives a broadcasted signal from a radio broadcasting station selected by operating the tuning slide 235 and outputs the signal to a component at the following stage. As a result, voices and sounds of the selected radio broadcasting station are output from the speaker 237.

At the next step S82, the control unit 241 controls the operation input unit 247 so as to ignore operations carried out by the user on the select button 232 and the cancel button 233. The control unit 241 also controls the display control unit 248 to turn off the active indicator 231. As a result, the select button 232 and the cancel button 233 are each put effectively in a state of being disabled to generate input signals and the active indicator 231 is turned off. The active indicator 231 is normally put in an off state. So, in this case, the off state is sustained.

At the next step S83, the control unit 241 forms a judgment as to whether or not the transmit button 236 has been pressed to set the response data transmission-mode. If the outcome of the judgment indicates that the response data transmission-mode has not been set, the flow of the reception processing goes on to a step S84.

At the next step S84, the control unit 241 forms a judgment as to whether or not an activate signal has been received. If the outcome of the judgment indicates that an activate signal has been received, the flow of the reception processing goes on to a step S85. At the step S85, the control unit 241 controls the operation input unit 247 so as to detect operations carried out by the user on the select button 232 and the cancel button 233 and also controls the display control unit 248 to turn on the active indicator 231. As a result, the select button 232 and the cancel button 233 are each put effectively in a state of being enabled to generate input signals and the active indicator 231 is turned on.

It should be noted that, if the outcome of the judgment formed at the step S84 indicates that an activate signal has not been received, on the other hand, the processing of the step S85 is skipped.

At the next step S86, the control unit 241 forms a judgment as to whether or not the select button 232 and the cancel button 233 are each put effectively in a state of being enabled to generate input signals and an answer to a question has been entered by operating the select button 232 and the cancel button 233. If the outcome of the judgment indicates that the select button 232 and the cancel button 233 are each put effectively in a state of being enabled to generate input signals and an answer to a question has been entered by operating the select button 232 and the cancel button 233, the flow of the reception processing goes on to a step S87.

At the next step S87, the control unit 241 stores an answer entered by operating the select button 232 and the cancel button 233 in response to a question, a question ID and the network address of a destination to which the answer is to be transmitted in the storage unit 249. The destination is the verification server 7. In the following description, the answer, the question ID and the network address of the destination are collectively referred to as answer-data.

It should be noted that, if the outcome of the judgment formed at the step S86 indicates that the select button 232 and the cancel button 233 have not each been put effectively in a state of being enabled to generate input signals or an answer to a question has not been entered by the user by operating the select button 232 and the cancel button 233, on the other hand, the processing of the step S87 is skipped.

At the next step S88, the control unit 241 forms a judgment as to whether or not a deactivate signal has been received. If the outcome of the judgment indicates that a deactivate signal has been received, the flow of the reception processing goes on to a step S89. At the step S89, the control unit 241 controls the operation input unit 247 so as to ignore operations carried out by the user on the select button 232 and the cancel button 233. The control unit 241 also controls the display control unit 248 to turn off the active indicator 231. As a result, the select button 232 and the cancel button 233 are each put effectively in a state of being disabled to generate input signals and the active indicator 231 is turned off.

Then, the flow of the reception processing goes back to the step S83 to carry out the processing repeatedly till the power supply of the receiver 10 is turned off.

It should be noted that, if the outcome of the judgment formed at the step S88 indicates that a deactivate signal has not been received, on the other hand, the flow of the reception processing goes back directly to the step S83, skipping the processing of the step S89. Then, the processing is carried out repeatedly till the power supply of the receiver 10 is turned off.

By the way, if the outcome of the judgment formed at the step S83 indicates that the answer-data transmission-mode has been set, on the other hand, the flow of the reception processing goes on to a step S90.

At the step S90, the control unit 241 carries out processing in the answer-data transmission-mode. The processing in the answer-data transmission-mode is explained by referring to a flowchart shown in FIG. 27.

Figure 27:
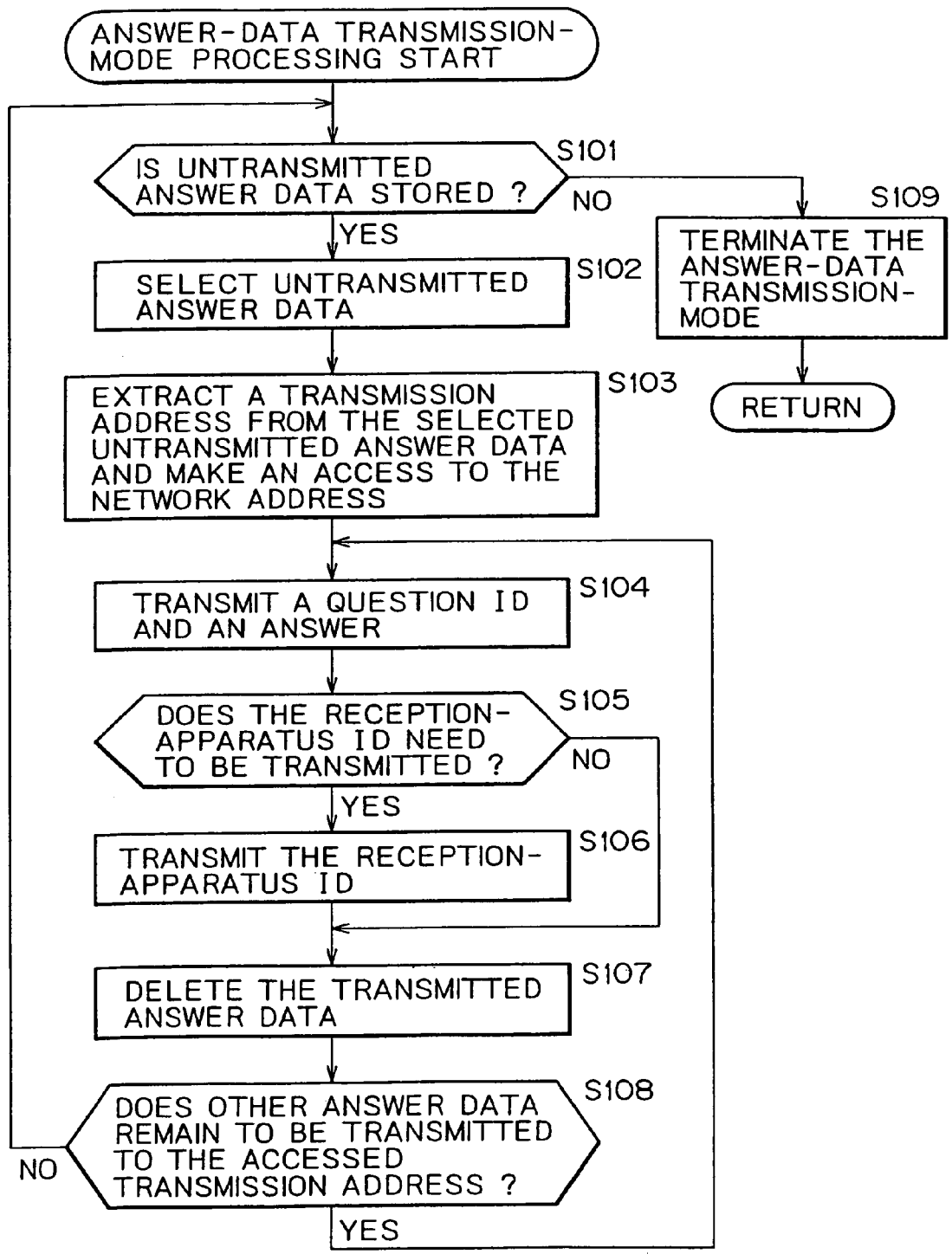
FIG. 27 is a flowchart used for explaining details of processing carried out in answer-data transmission-mode at a step S90 of the flowchart shown in FIG. 26.

The flowchart shown in FIG. 27 begins with a step S101 at which the control unit 241 forms a judgment as to whether or not the answer-data to be transmitted to the verification server 7 is stored in the storage unit 249. If the outcome of the judgment indicates that the answer-data to be transmitted to the verification server 7 is stored in the storage unit 249, the flow of the processing in the answer-data transmission-mode goes on to a step S102.

At the step S102, the control unit 241 selects a piece of answer-data stored in the storage unit 249 and reads out the selected piece of answer-data. At the next step S103, the control unit 241 extracts the network address of the verification server 7 serving as a destination from the piece of answer-data read out from the storage unit 249. Controlled by the control unit 241, the communication unit 253 makes an access to the destination by dialing in order to establish a communication.

At the next step S104, controlled by the control unit 241, the communication unit 253 transmits an answer and an answer ID included in the answer-data to the verification server 7 accessed at the step S103.

At the next step S105, the control unit 241 forms a judgment as to whether or not a reception-apparatus ID is to be added to the answer and the answer ID, which were transmitted at the step S104, and to be transmitted too. If the outcome of the judgment indicates that a reception-apparatus ID is to be added and to be transmitted as well, the flow of the processing in the answer-data transmission-mode goes on to a step S106. It should be noted that, as a condition for determining that a reception-apparatus ID is to be added and to be transmitted in this judgment, the apparatus collecting answers desires such a reception-apparatus ID and the user of the receiver 10 consents to transmission of the reception-apparatus ID. The existence or non-existence of the answer collecting apparatus' desire for a reception-apparatus ID is indicated by information embedded in the broadcasted signal.

At the step S106, controlled by the control unit 241, the transmission unit 253 transmits the reception-apparatus ID to the verification server 7 accessed at the step S103. It should be noted that, if the outcome of the judgment formed at the step S105 indicates that a reception-apparatus ID is not to be added and to be transmitted, on the other hand, the processing of the step S106 is skipped.

At the next step S107, controlled by the control unit 241, the storage unit 249 deletes the piece of answer-data transmitted at the step S104. At the next step S108, the control unit 241 forms a judgment as to whether or not the storage unit 249 still includes another piece of answer-data to be transmitted to the destination accessed at the step S103 to establish a communication therewith. If the outcome of the judgment indicates that such a piece of answer-data remains in the storage unit 249 to be transmitted to the destination with an established communication, the flow of the processing in the answer-data transmission-mode goes back to the step S104 to repeat the processing starting with the step S104.

If the outcome of the judgment formed at the step S108 indicates that no more piece of answer-data remains in the storage unit 249 to be transmitted to the destination with an established communication, on the other hand, the communication established at the step S103 is terminated. Then, the flow of the processing in the answer-data transmission-mode goes back to the step S101 to repeat the processing starting with the step S101.

If the outcome of the judgment formed at the step S101 indicates that no answer-data to be transmitted is stored in the storage unit 249, on the other hand, the flow of the processing in the answer-data transmission-mode goes on to a step S109. At the step S109, the control unit 241 releases the receiver 10 from the answer-data transmission-mode. The flow of the processing then goes back to the step S82 of the flowchart shown in FIG. 26.

By virtue of the reception processing carried out by the receiver 10 as described above, the user is capable of transmitting an answer to the verification server 7 automatically by merely pressing the transmit button 236 without performing processing to write words or to make a phone call.

In the reception processing described above, in the answer-data transmission-mode set by pressing the transmit button 236, answer-data is transmitted. It should be noted, however, that answer-data can also be transmitted periodically such as every Monday or every weekend. As an alternative, a piece of answer-data is transmitted only when the number of pieces of answer-data stored in the storage unit 249 exceeds a predetermined number.

Figure 28:
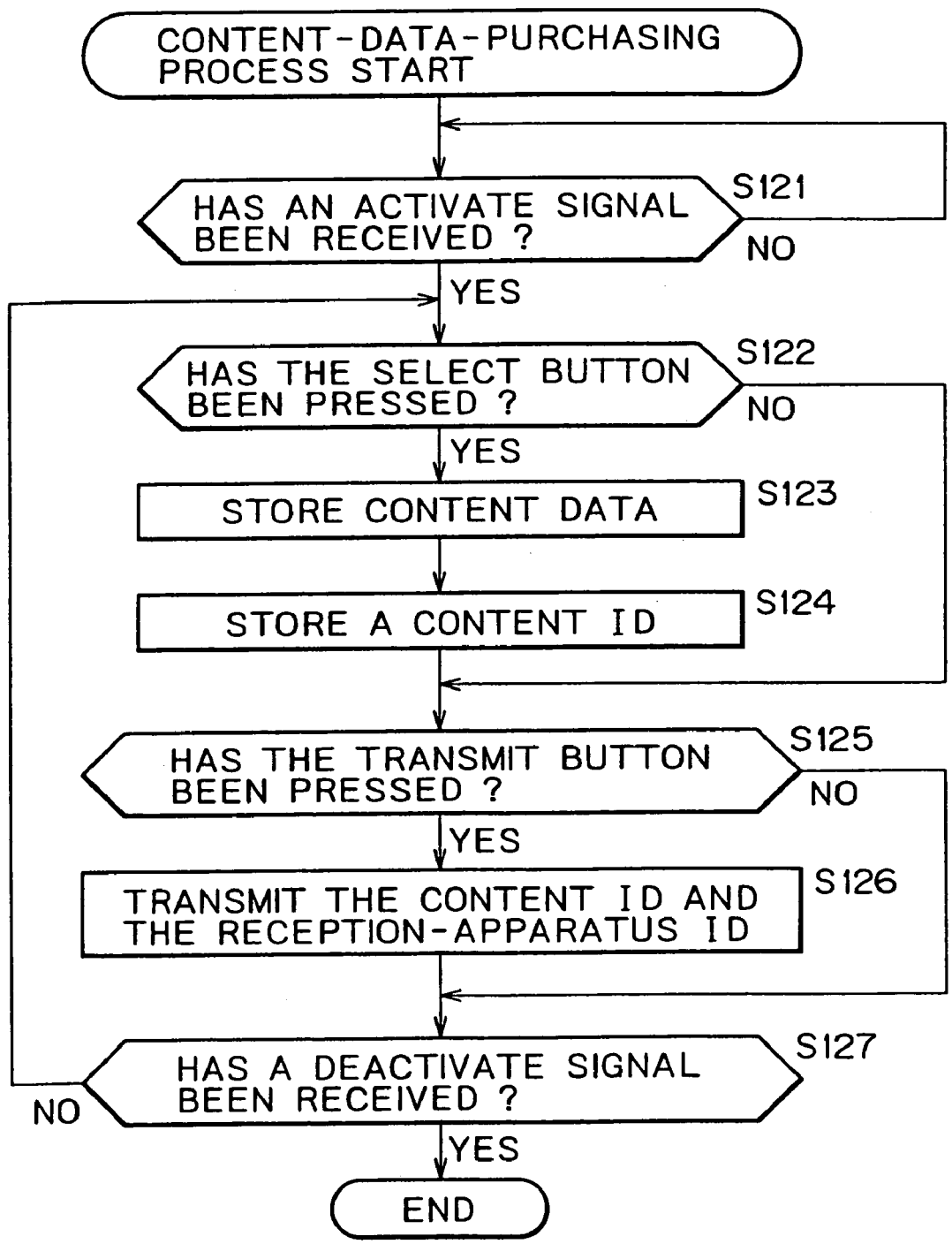
FIG. 28 is a flowchart used for explaining details of processing carried out by the receiver shown in FIG. 24 to purchase content data.

The following description explains processing carried out by the receiver 10 to purchase content data sold by multiplexing the data in a signal broadcasted by the broadcasting apparatus 5 by referring to a flowchart shown in FIG. 28. The processing to purchase content data is started when the control unit 241 detects content data multiplexed in a broadcasted signal in a radio broadcast received by the receiver 10.

The flowchart shown in FIG. 28 begins with a step S121 at which the control unit 241 forms a judgment as to whether or not an activate signal has been received. The control unit 241 is in a wait state, forming the judgment repeated till the outcome of the judgment indicates that an activate signal has been received. As the outcome of the judgment indicates that an activate signal has been received, the control unit 241 controls the operation input unit 247 so as to detect operations carried out by the user on the select button 232 and the cancel button 233 and also controls the display control unit 248 to turn on the active indicator 231. As a result, the select button 232 and the cancel button 233 are each put effectively in a state of being enabled to generate input signals and the active indicator 231 is turned on.

At the next step S122, the control unit 241 forms a judgment as to whether or not the select button 232 was pressed and the cancel button 233 was not. If the outcome of the judgment indicates that the select button 232 was pressed and the cancel button 233 was not, the flow of the purchase processing goes on to a step S123.

At the step S123, the storage unit 249 stores content data separated by the received-signal separation unit 251 in accordance with control executed by the control unit 241. At the next step S124, the storage unit 249 stores the content ID of the recorded content data in accordance with control executed by the control unit 241.

It should be noted that if the outcome of the judgment formed at the step S122 indicates that the select button 232 was not pressed or the cancel button 233 was pressed, on the other hand, the pieces of processing of the steps S123 and S124 are skipped.

At the next step S125, the control unit 241 forms a judgment as to whether or not the transmit button 236 was pressed. If the outcome of the judgment indicates that the transmit button 236 was pressed, the flow of the purchase processing goes on to a step S126. At the step S126, the transmission unit 253 transmits the content ID of a content data and the receiver-ID, which are stored in the storage unit 249, to the broadcasting apparatus 5 in accordance with control executed by the control unit 241.

At the next step S127, the control unit 241 forms a judgment as to whether or not a deactivate signal has been received. If the outcome of the judgment indicates that a deactivate signal has not been received, the flow of the purchase processing goes back to the step S122 to repeat the processing starting with the step S122. If the outcome of the judgment formed at the step S127 indicates that a deactivate signal has been received, on the other hand, the control unit 241 controls the operation input unit 247 so as to ignore operations carried out by the user on the select button 232 and the cancel button 233 and also controls the display control unit 248 to turn off the active indicator 231. As a result, the select button 232 and the cancel button 233 are each put effectively in a state of being disabled to generate input signals and the active indicator 231 is turned off.

As described above, if the outcome of the judgment formed at the step S122 indicates that the select button 232 was not pressed or the cancel button 233 was pressed, the pieces of processing of the steps S123 and S124 are skipped. If the outcome of the judgment formed at the step S125 indicates that the transmit button 236 was not pressed, on the other hand, the processing of the step S126 is skipped.

In the processing to purchase content data as described above, encrypted content data is stored in the storage unit 249. In order to make a request for a decryption key for decrypting the encrypted content data, it is necessary to transmit the content ID and the receiver-ID to the broadcasting apparatus 5.

The broadcasting apparatus 5 transmits a decryption key indicated by the content ID received from the receiver 10 to the receiver 10 indicated by the receiver-ID also received from the receiver 10.

In accordance with the above description, an additional-information-inputting prompt is transmitted by multiplexing the prompt with program data as tag codes. As an alternative, the additional-information-inputting prompt can also be stored in the database 43 of the ID-assigning functional unit 42. Then, in authentication processing with the verification functional unit 47, the additional-information-inputting prompt stored in the database 43 is detected and used for prompting the user to enter additional information.

In addition, while the receiver-management functional unit 48 is provided in the verification server 7 in the embodiment described above, the receiver-management functional unit 48 can also be provided in the receiver 10.

As an alternative, any 2 or more of the verification server 7, the privacy-guarding server 8, the ID-assigning server 3 and the tagging server 4 can be combined into a single server configuration, or the tagging server 4 can also be integrated with the broadcasting apparatus 5 into a single unit.

Additional information can be entered in a variety of formats such as numbers of the ten keys, a text generated by the keyboard or a hand written letter recognizing device, graphics generated by a pen or a mouse, a sound or a picture.

Profile-information of a user may include the age, content restrictions, a payment method, an occupation, a postal address, a name, an income, a gender, information on airline mileage, customer numbers for a variety of stores, favorite hotel rooms, information on smoking or non-smoking and other data, which are pertinent to the user.

In the processing described above, as settlement of an account, a payment can be made by using a credit card. However, the account-settlement method can also be determined from a gender and an occupation included in the profile-information. Assume for example that a service is rendered to transmit data representing a digital picture of commodity A through a network in return for information on the age, the gender and the hobbies of a person interested in commodity A. In this case, the fee of the service is determined by the age, the gender and the hobbies. The determination of the fee may also be regarded to fall within a broad definition of the meaning of an account-settlement method. In such a case, on the account-settlement method column of the database 51 shown in FIG. 22, in place of a credit card number of VISA 123 45678 XXXX, it is possible to prescribe a phrase stating: "The gender, the occupation and other data included in the profile-information."

The restriction described as the time and date information of a response condition is not limited to an end time and date but can also be a start time and date. While a time and date in a response condition according to the embodiment is acquired from the calendar timer 134 employed in the receiver 10, the time and date can also be acquired from a calendar timer provided in the verification functional unit 47. In this case, a time and date obtained from the calendar timer provided in the verification functional unit 47 is corrected and set as a time and date in the response condition. In this way, a correct time and date can be obtained from information generated by the calendar timer provided in the verification functional unit 47 even if the calendar timer 134 provided in the receiver 10 is out of order. By providing a calendar timer in the receiver 10, however, it is possible to set a deadline taking a time zone having a difference in time into consideration. The restriction described as the time and date information of a response condition is used typically as a use restriction related to the validity term of a copyright of the content.

In a process of evaluation wherein a privacy-guarding item of a set is compared with a privacy-guarding item of another set, character-to-character comparison can be implemented. As an alternative, a distance between regions specified in an area specifying process is treated as a variable of a function and evaluation can be carried out by comparing the value of a function with the value of another function.

In addition, the evaluation and the comparison of privacy-guarding items can be carried out by functions in a broadcasted manner.

Disclosures of all pieces of profile-information, all response conditions and all pieces of additional information to the content provider every time do not contribute to protection of privacy. In addition, the content provider does not always need all pieces of profile-information, all response conditions and all pieces of additional information. By storing all pieces of profile-information, all response conditions and all pieces of additional information in a memory, a memory with a large size is required inevitably. Furthermore, it is against the content provider's will to hold the provider responsible for protection management only because the provider receives a more amount of information than necessary. Thus, prescription of privacy-guarding items is also meaningful to the content provider since such prescription allows the provider to take in only necessary information. As for the user, it is possible to present itself as an anonymous participant.

Tag codes, a provider ID, a content ID, a broadcasting serial ID, a response condition, profile-information, additional information and other data, which are held by the receiver 10, are stored in a memory that can be removed from the receiver 10 when necessary. Examples of such a memory are an IC card, a memory card, a memory stick (trademark), a CD, an MD, a hard disk, another kind of magnetic recording media and an optical recording medium. In this way, by connecting the main unit of the receiver 10 to the verification functional unit 47 or by connecting only such a memory to the verification functional unit 47, it is possible to carry out verification.

The above description explains an example in which the present invention is applied to satellite digital radio communication. As explained as the specifications shown in FIG. 14, however, tag-data can be broadcasted by adoption of the multi-cast technique using the hand phone or the Internet or by adopting another communication technique such as satellite television, ground-wave television, ground-wave radio, CATV or satellite-data communication.

The series of pieces of processing described above can be carried out by hardware or through execution of software. When execution of software is selected for carrying out the series of pieces of processing, a variety of programs composing the software are executed by a computer incorporated in special hardware. As an alternative, the programs are installed in a recording memory employed in typically a general purpose personal computer capable of executing the programs to carry out the pieces of processing.

As shown in FIG. 3, a recording medium for presenting a program to the user is broadcasted separately from the main unit of the apparatus. In order to present a program to the user, however, the use of package media is not mandatory. As mentioned before, examples of the package media are the magnetic disk 71 including a floppy disk, the optical disk 72 including a CD-ROM (Compact Disk Read Only Memory) and a DVD (Digital Versatile Disk), the magnetic optical disk 73 including an MD (Mini Disk) and the semiconductor memory 74. As an alternative, a program can also be presented to the user by incorporating the program in the main unit of the apparatus in advance. That is to say, the program is stored in a ROM 62 or a hard disk included in the storage unit 68.

It should be noted that, in this specification, while steps prescribed in a program recorded in a recording medium can of course be executed sequentially along the time axis in an order the steps are prescribed in the program, the steps are not always executed sequentially along the time axis. That is to say, a program may include steps that are executed concurrently or independently.

In addition, the technical term 'system' used in this specification means the whole equipment comprising a plurality of apparatuses.

In accordance with the system described above, the following effects are exhibited.

1: The ID assignment function and the verification function are separated from content providers and shared by the providers as functions independent of the providers. Thus, the functions can be provided for a plurality of content providers.
2: By carrying out a tagging process and enclosing a portion relying on media in a tag, the portion can be made independent of the ID assignment function and the verification function and, therefore, the functions can be provided for a plurality of media.
3: By allowing the ID assignment function on the content sender side and the verification function on the content recipient side to share information, responses from recipients can be collated with offerings broadcasted by broadcasting by using a mechanized means with a higher degree of efficiency.
4: By leaving a validity-condition set by a content provider with the ID assignment function, the validity-condition can be collated with a receiver's response condition, profile-information and additional information by using a mechanized means with a higher degree of efficiency.
5: A mechanically collectable environment of a receiver which is dependent on a response condition can be collated with a validity-condition.
6: A receiver's environment cataloged in advance from profile-information can be collated with a validity-condition.

7: Information input from a receiver on the spot as additional information can be collated with a validity-condition.
8: Since privacy-guarding items can be left with a privacy-guarding functional unit, privacy-guarding items declared by the presentation functional unit, an ID assignment functional unit, a verification functional unit and the reception functional unit can be collated with each other by using a mechanized means. As a result, an anonymous person is capable of obtaining a content.
9: Since a function to order and deliver an actual commodity, that is, a content, and a function to determine a price for the commodity are separated from and made independent of a presentation functional unit and a reception functional unit, it is possible to implement a system adaptable to a variety of digital content secured deliveries and various kinds of commodity and financial circulation.

What is claimed is:

1. A computer-readable recording medium including computer program instructions, which when executed by hardware cause the hardware to perform a method of privacy guarding, comprising:
   receiving user profile information, privacy-guarding data of a user, and privacy-guarding data of a content provider, wherein the privacy-guarding data of a user defines each of a plurality of parameters in the user profile as being one of a static privacy guarded parameter or a dynamic privacy guarded parameter;
   determining, based on the privacy-guarding data of a user and the privacy-guarding data of a content provider, whether a privacy function is activated;
   requesting content from the content provider based on a request received from an information processing apparatus corresponding to the user;
   transmitting, when the privacy guarding function is not activated, a notification that the privacy function is not activated;
   transmitting at least a portion of the user profile to the contents provider if the privacy function is activated, wherein the at least portion of the user profile transmitted are defined as not guarded by the privacy-guarding data of a user;
   controlling transmission of a dynamic privacy guarded parameter to the content provider based on a rating of the content provider included in the privacy guarding data of the content provider;
   controlling transmission of a static privacy guarded parameter to the content provider regardless of a rating of the content provider included in the privacy guarding data of the content provider; and
   paying a fee for the requested content to the content provider on behalf of the user when data of the user profile defined as guarded by the privacy-guarding data of the user includes a user's account settlement method.

2. The method of claim 1, wherein the privacy-guarding data of a user defines a plurality of parameters in the user profile to either be privacy guarded parameters or non-privacy guarded parameters.

3. The method of claim 1, wherein the notification that the privacy function is not activated is transmitted to the information processing apparatus corresponding to the user.

4. The method of claim 1, wherein the notification that the privacy function is not activated is transmitted to a verification unit, which, upon receiving the notification, is configured to initiate an exchange of the user profile information to the content provider.

5. A privacy guarding apparatus, comprising:
   an interface configured to receive user profile information, privacy-guarding data of a user, and privacy-guarding data of a content provider, wherein the privacy-guarding data of a user defines each of a plurality of parameters in the user profile as being one of a static privacy guarded parameter or a dynamic privacy guarded parameter;
   a module configured to determine, based on the privacy-guarding data of a user and the privacy-guarding data of a content provider, whether a privacy function is activated;
   an interface configured to request content from the content provider based on a request received from an information processing apparatus corresponding to the user;
   an interface configured to transmit, when the privacy guarding function is not activated, a notification that the privacy function is not activated;
   an interface configured to transmit at least a portion of the user profile to the contents provider if the privacy function is activated, wherein the at least portion of the user profile transmitted are defined as not guarded by the privacy-guarding data of a user; and
   an order placing unit configured to pay a fee for the requested content to the content provider on behalf of the user when data of the user profile defined as guarded by the privacy-guarding data of the user includes a user's account settlement method,
   wherein the interface is configured to control transmission of a dynamic privacy guarded parameter to the content provider based on a rating of the content provider included in the privacy guarding data of the content provider, and
   the interface is configured to control transmission of a static privacy guarded parameter to the content provider regardless of a rating of the content provider included in the privacy guarding data of the content provider.

6. The apparatus of claim 5, wherein the privacy-guarding data of a user defines a plurality of parameters in the user profile to either be privacy guarded parameters or non-privacy guarded parameters.

7. The apparatus of claim 5, wherein the interface is configured to transmit the notification that the privacy function is not activated to the information processing apparatus corresponding to the user.

8. The apparatus of claim 5, wherein the interface is configured to transmit the notification that the privacy function is not activated to a verification unit, which, upon receiving the notification, is configured to initiate an exchange of the user profile information to the content provider.

* * * * *